Aug. 7, 1951   W. DÄLLENBACH   2,563,585
CAVITY RESONATOR APPARATUS FOR GENERATING
HIGH ELECTRIC POTENTIALS
Filed Nov. 9, 1946   32 Sheets-Sheet 3
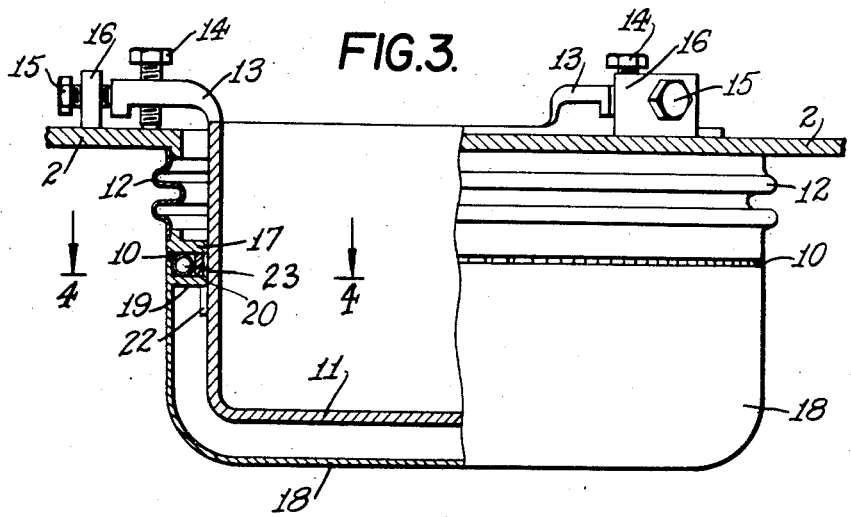
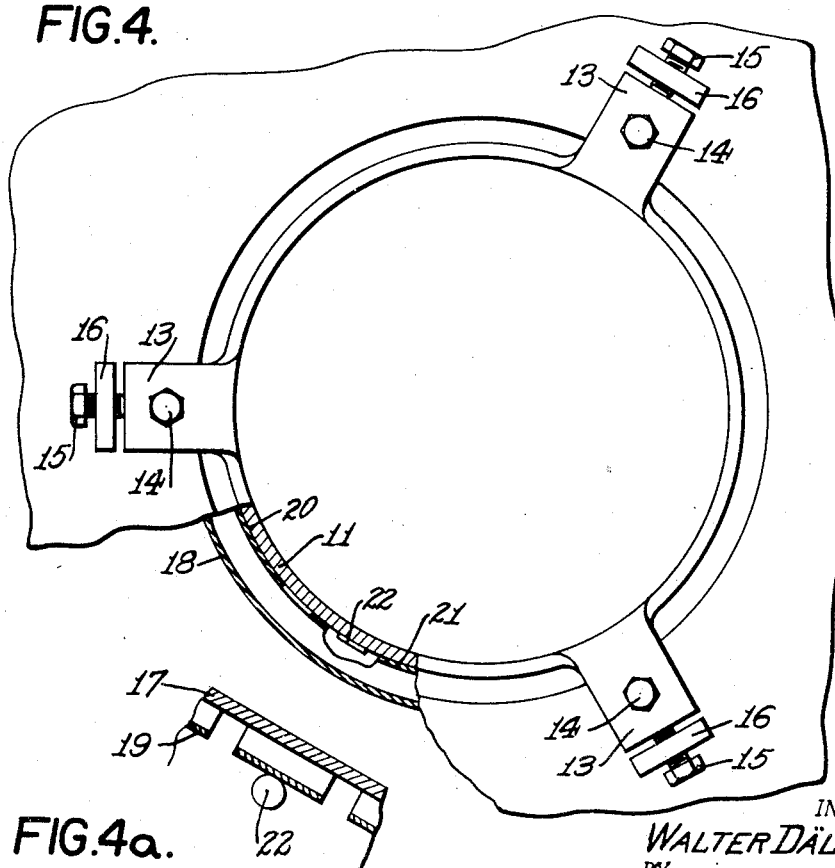
INVENTOR.
WALTER DÄLLENBACH
BY
ATTORNEY

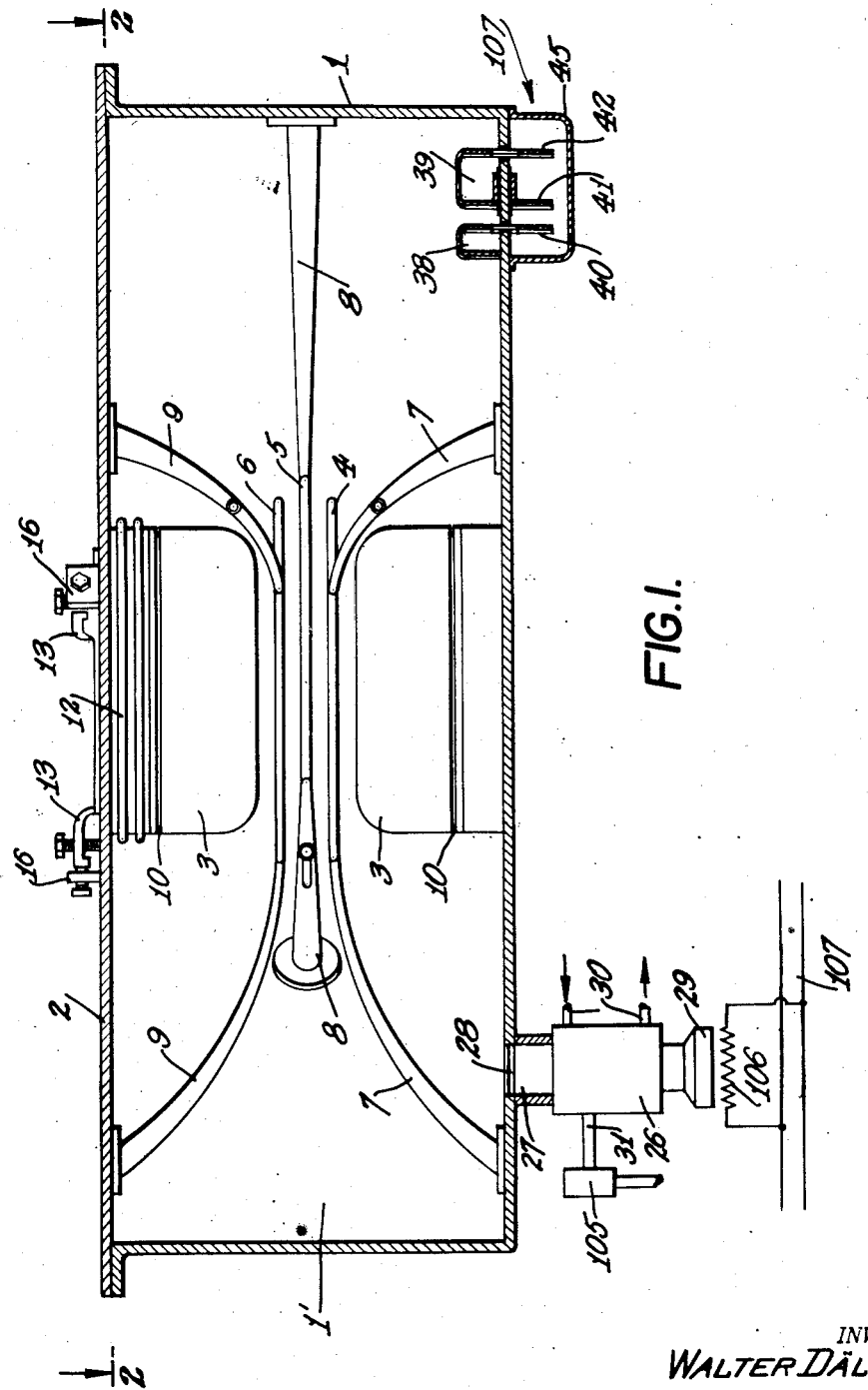

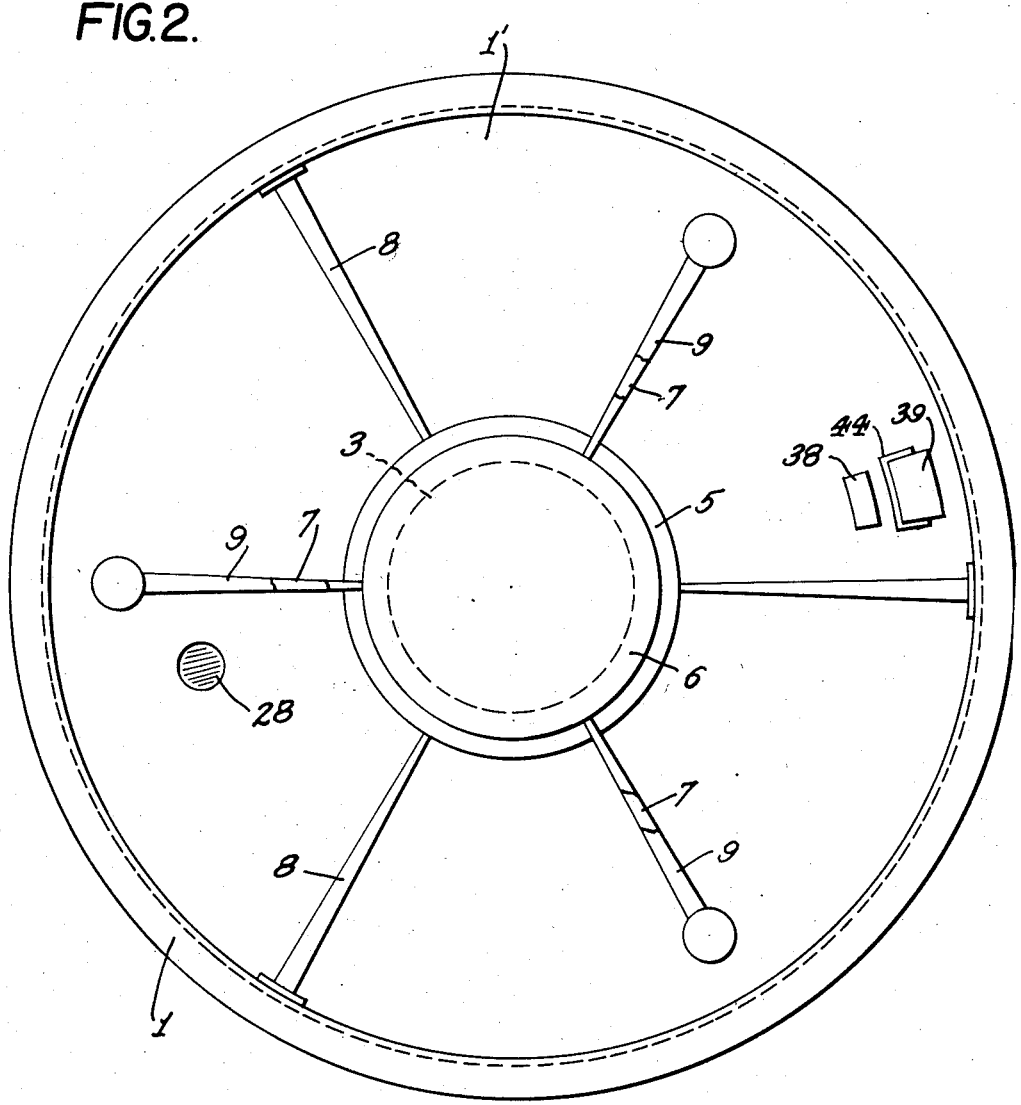

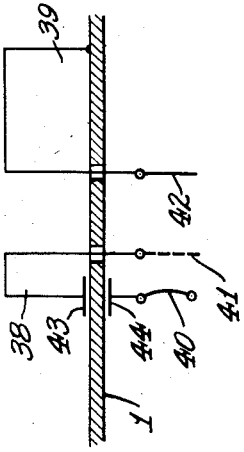
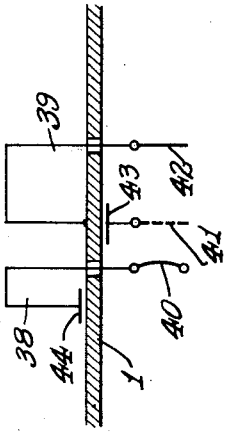
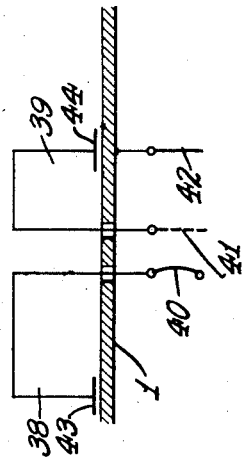
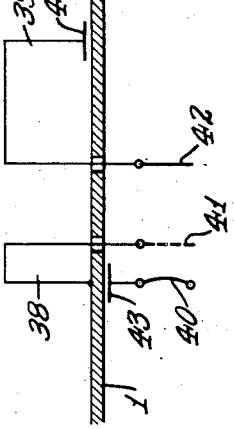
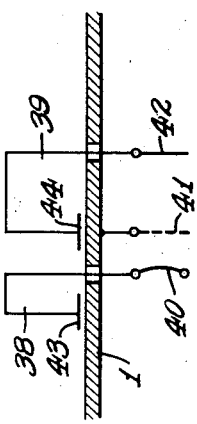
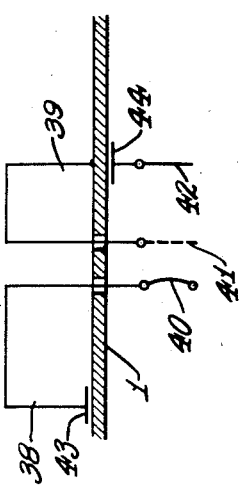
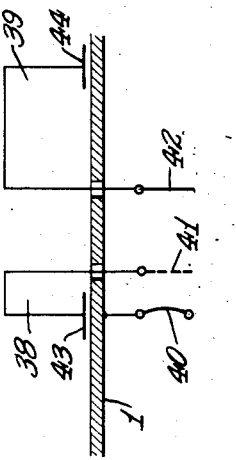
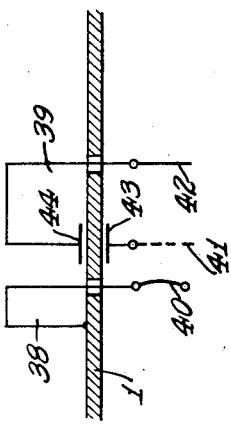

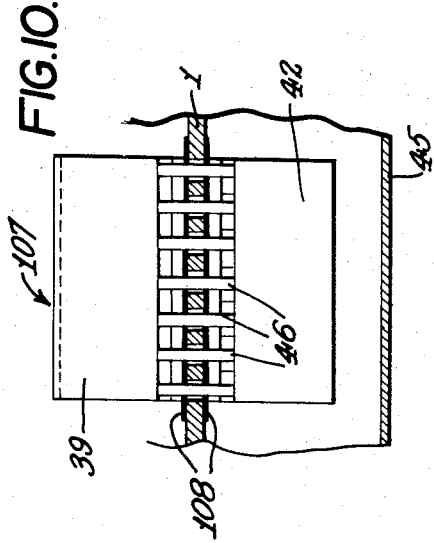
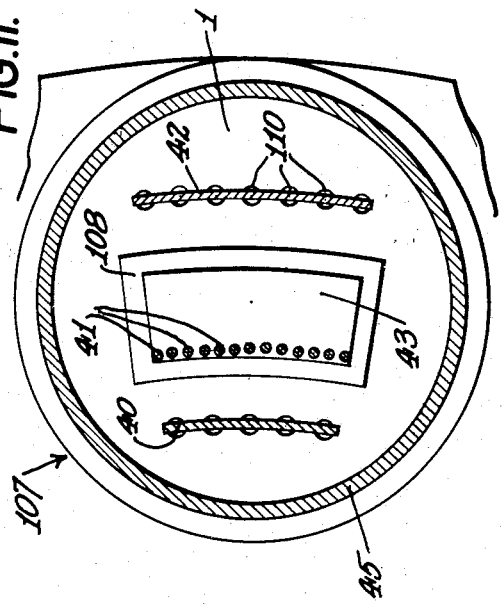
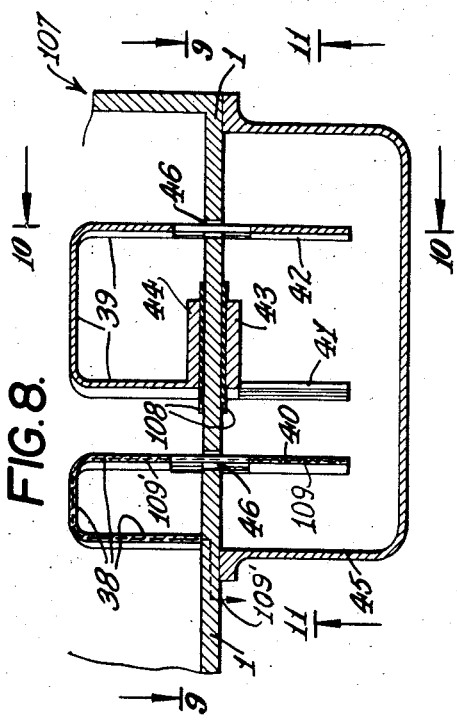
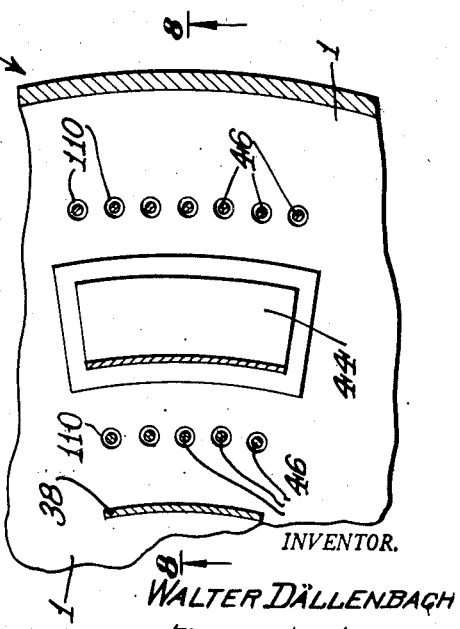
INVENTOR.
WALTER DÄLLENBACH
BY
ATTORNEY

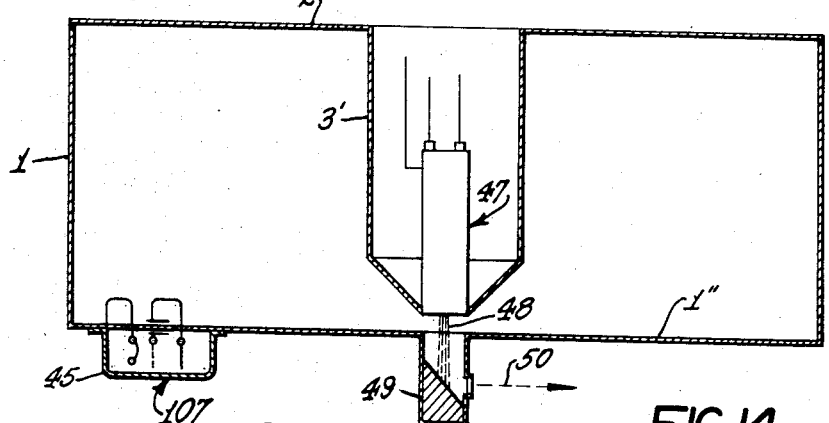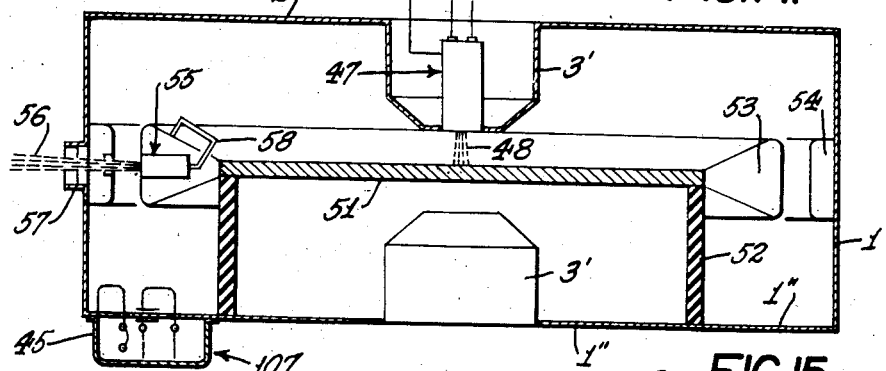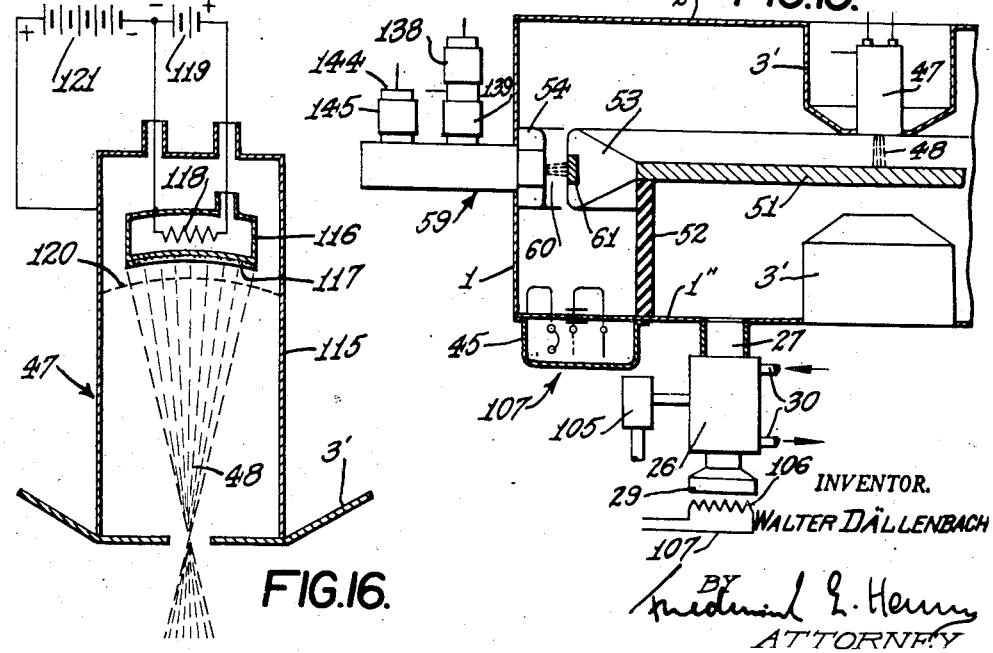

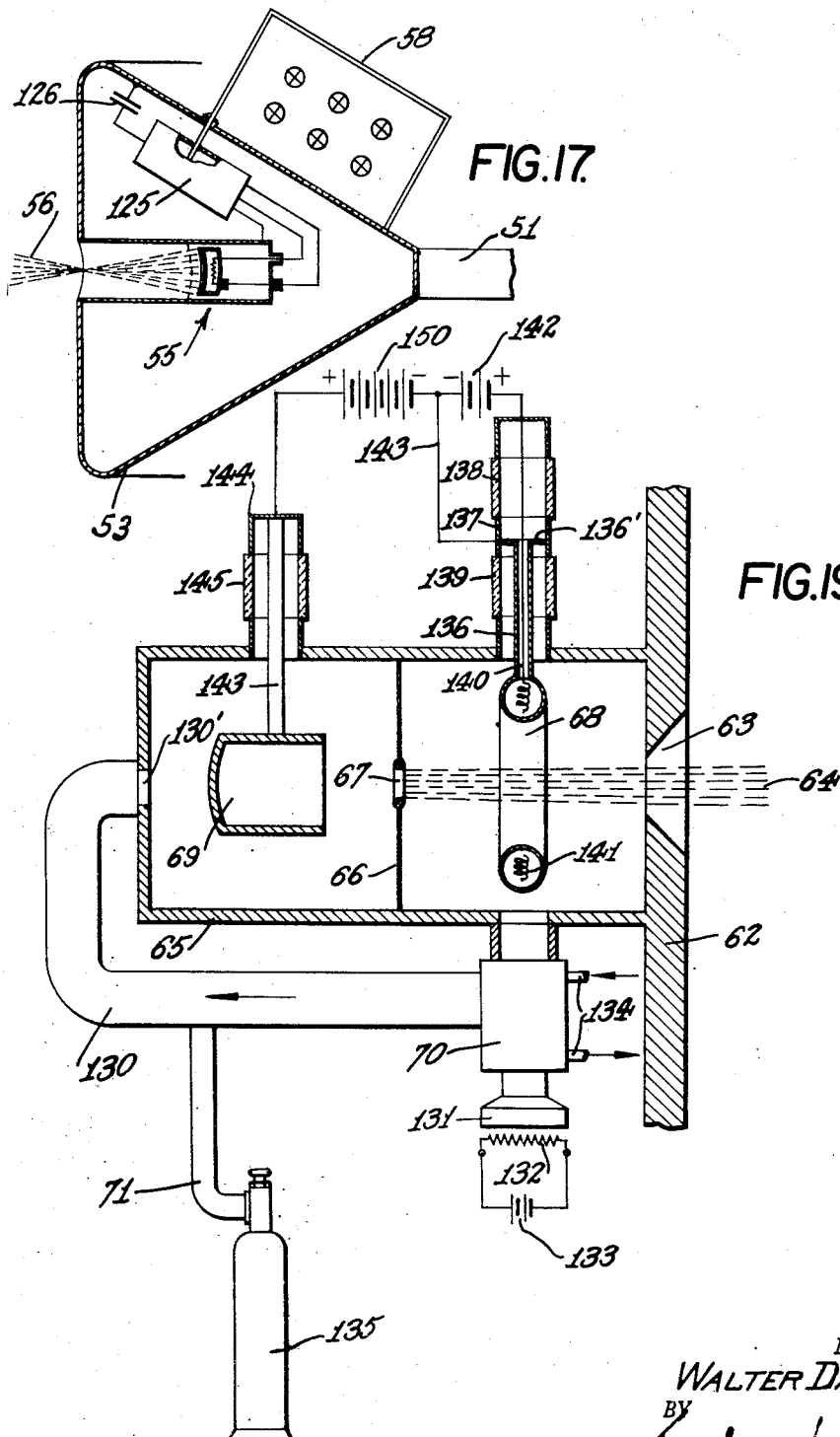

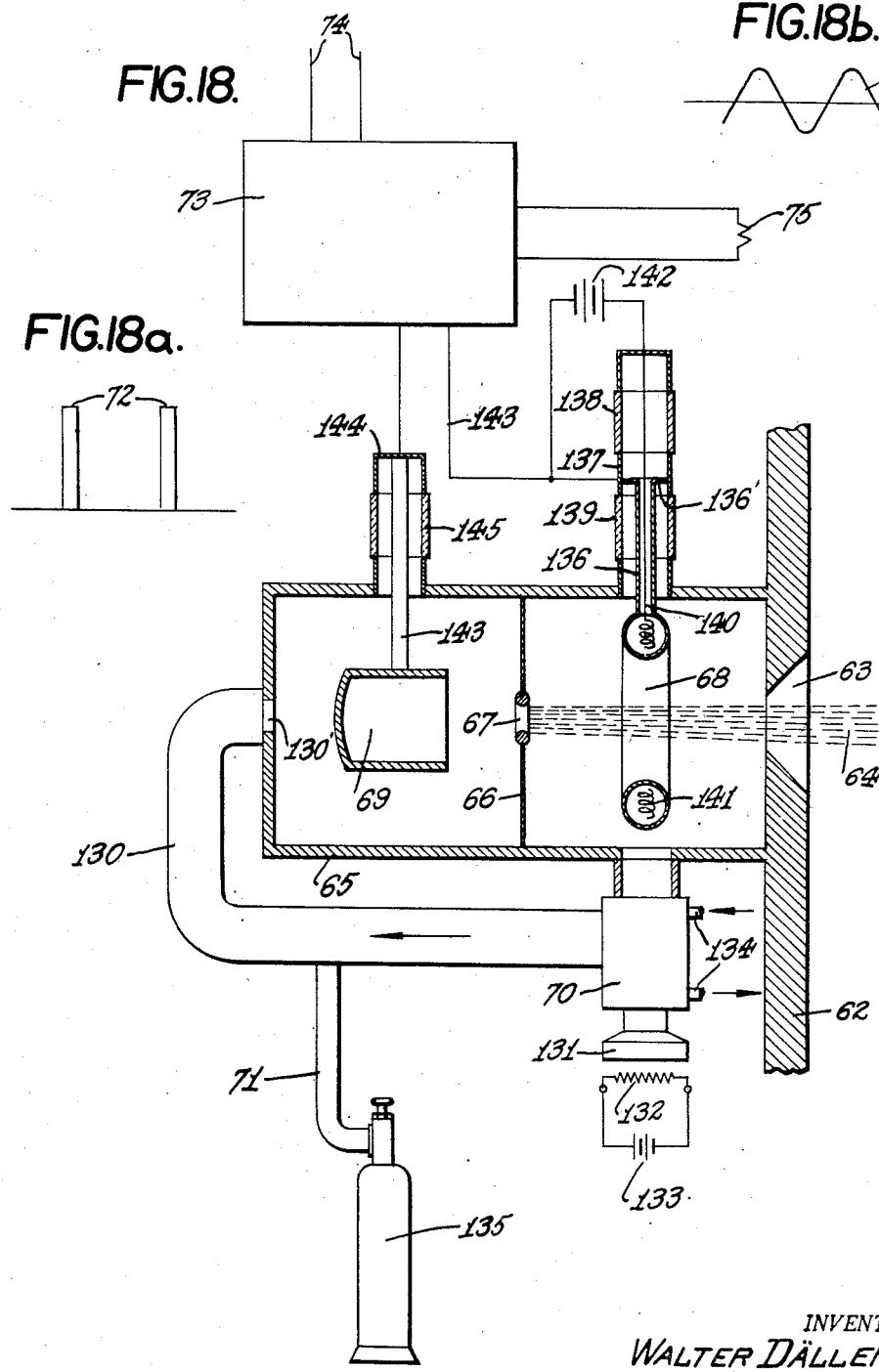

Aug. 7, 1951 W. DÄLLENBACH 2,563,585
CAVITY RESONATOR APPARATUS FOR GENERATING
HIGH ELECTRIC POTENTIALS
Filed Nov. 9, 1946 32 Sheets-Sheet 11

INVENTOR.
WALTER DÄLLENBACH
BY
ATTORNEY

Aug. 7, 1951    W. DÄLLENBACH    2,563,585
CAVITY RESONATOR APPARATUS FOR GENERATING
HIGH ELECTRIC POTENTIALS
Filed Nov. 9, 1946    32 Sheets-Sheet 12

INVENTOR.
WALTER DÄLLENBACH
BY
ATTORNEY

Aug. 7, 1951 W. DÄLLENBACH 2,563,585
CAVITY RESONATOR APPARATUS FOR GENERATING
HIGH ELECTRIC POTENTIALS
Filed Nov. 9, 1946 32 Sheets-Sheet 13

INVENTOR.
WALTER DÄLLENBACH
BY
ATTORNEY

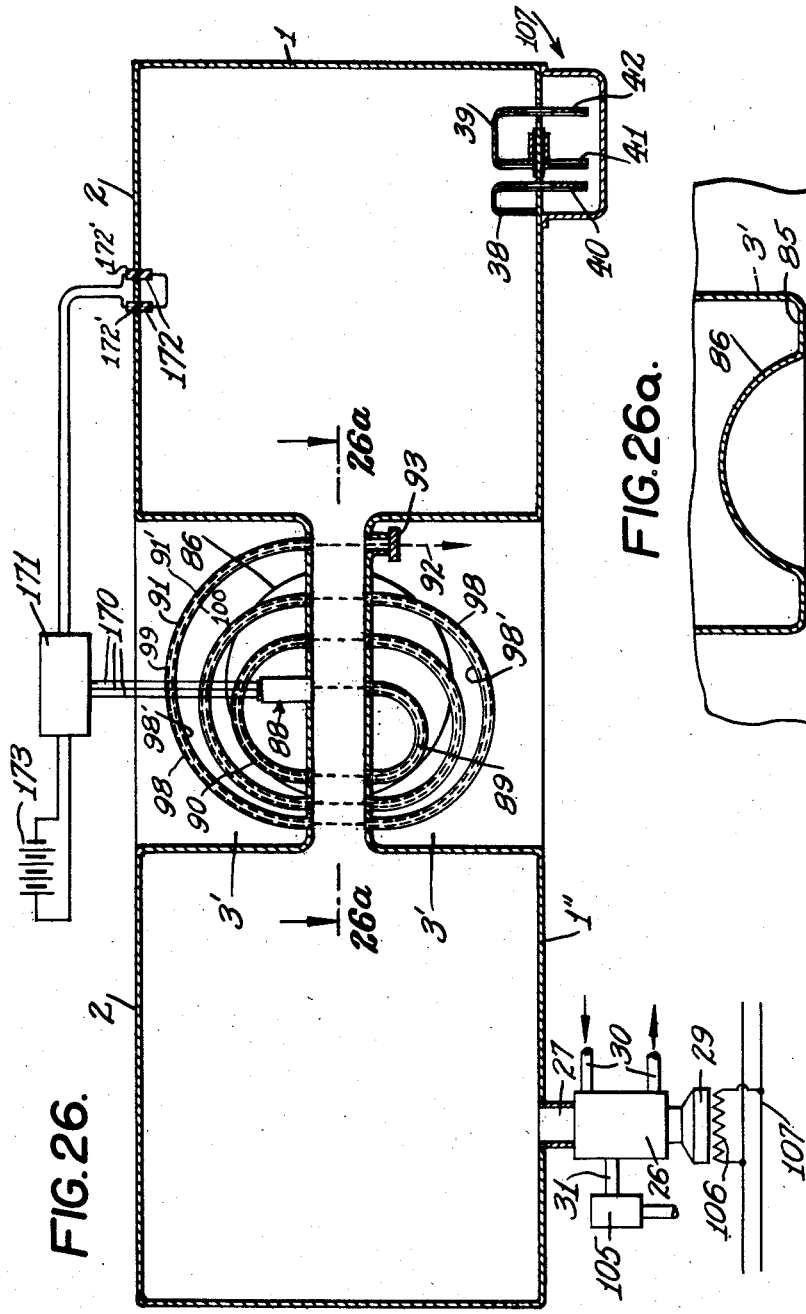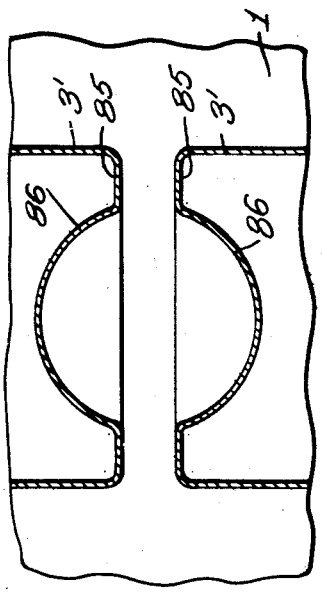

INVENTOR.
WALTER DÄLLENBACH
BY
*[signature]*
ATTORNEY

INVENTOR.
WALTER DÄLLENBACH
BY
ATTORNEY

Aug. 7, 1951  W. DÄLLENBACH  2,563,585
CAVITY RESONATOR APPARATUS FOR GENERATING
HIGH ELECTRIC POTENTIALS
Filed Nov. 9, 1946  32 Sheets-Sheet 19
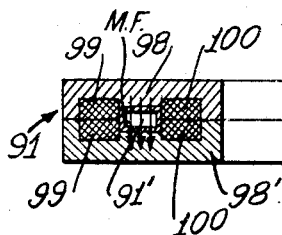
FIG. 34.
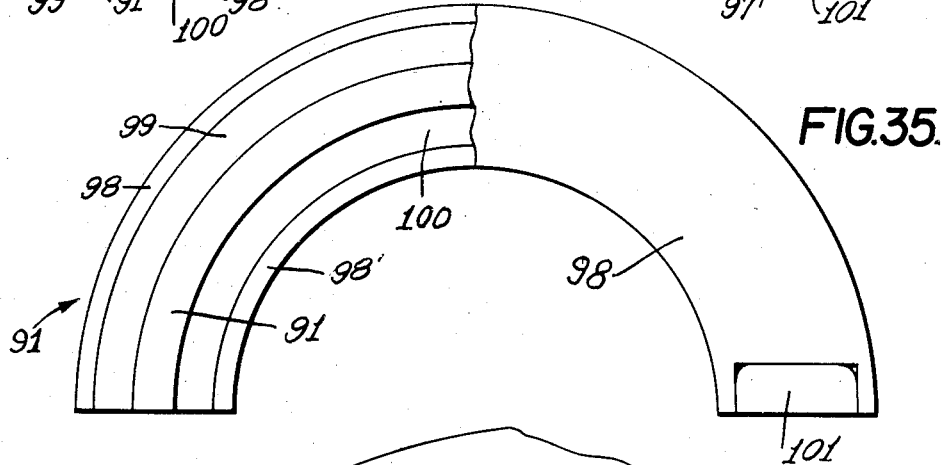
FIG. 35.
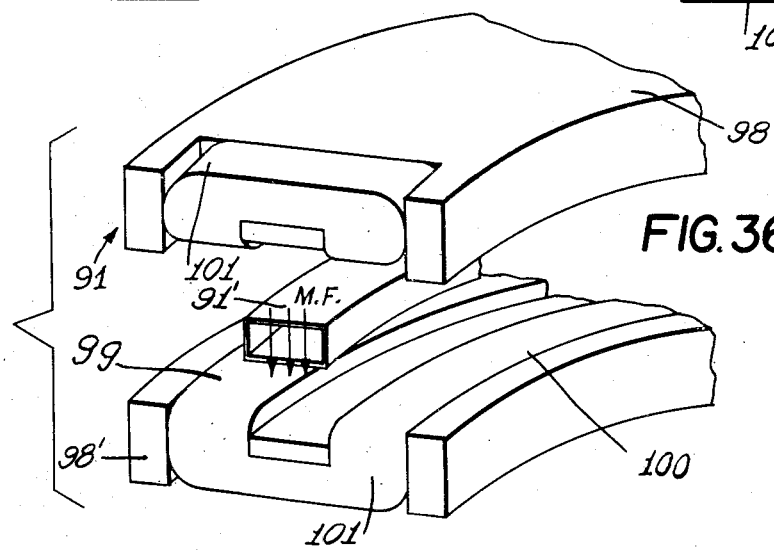
FIG. 36.
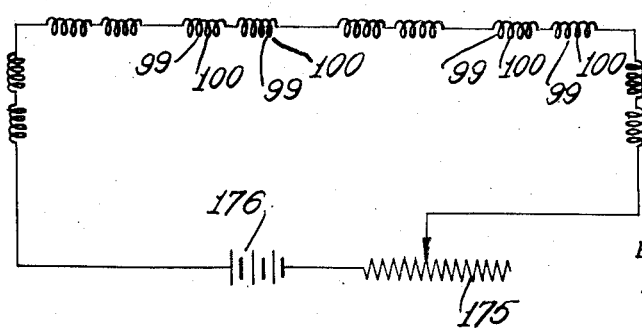
FIG. 36a.
INVENTOR.
WALTER DÄLLENBACH
BY
ATTORNEY Aug. 7, 1951 W. DÄLLENBACH 2,563,585
CAVITY RESONATOR APPARATUS FOR GENERATING
HIGH ELECTRIC POTENTIALS
Filed Nov. 9, 1946 32 Sheets-Sheet 20

INVENTOR.
WALTER DÄLLENBACH
BY
Frederick E. Harry
ATTORNEY

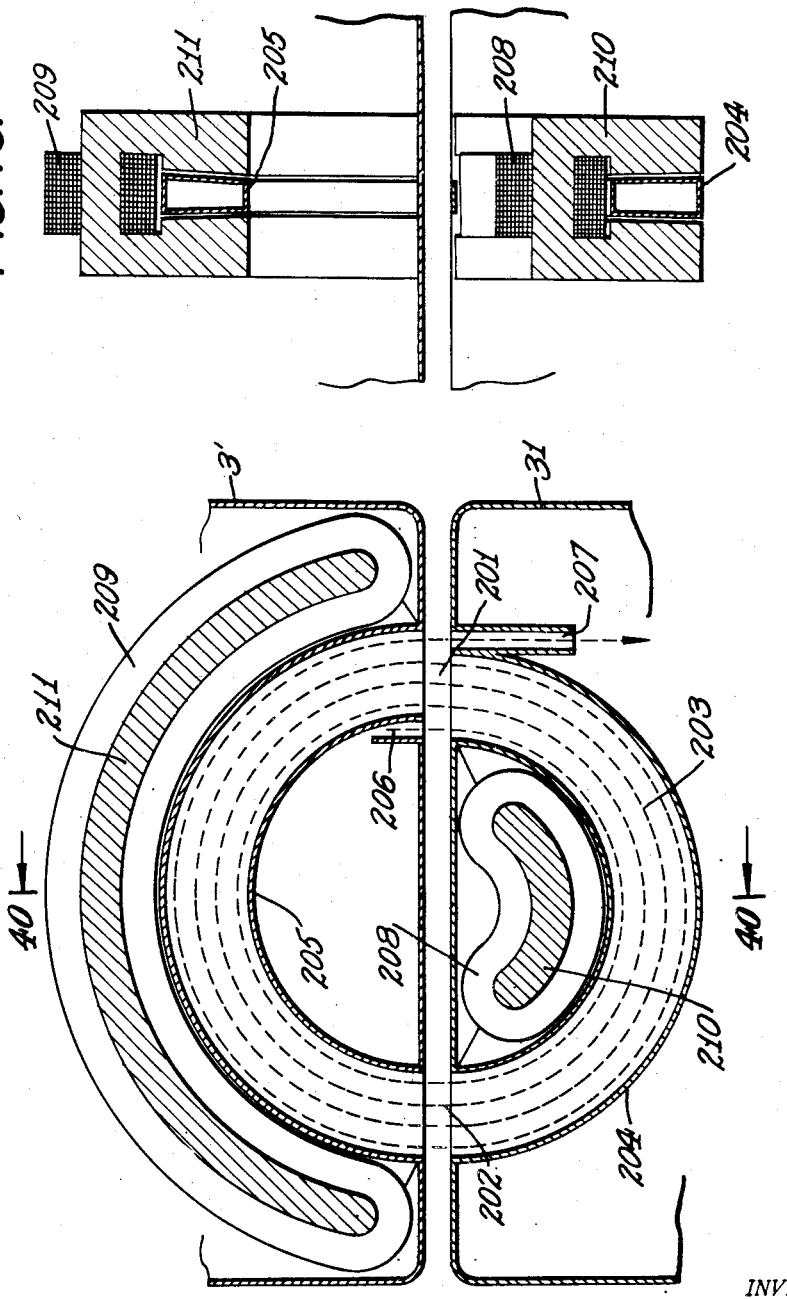

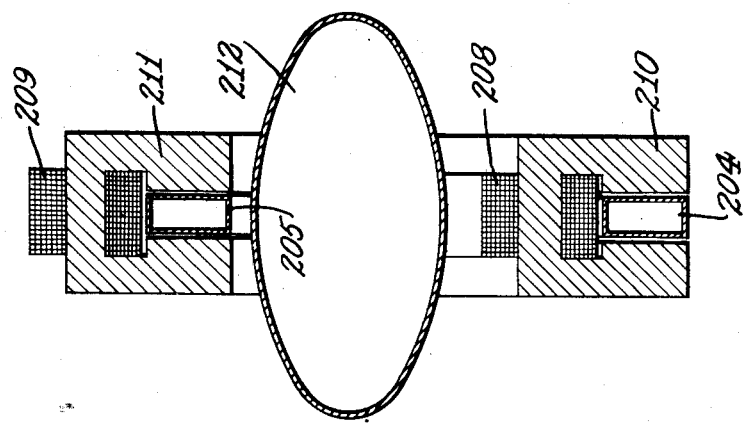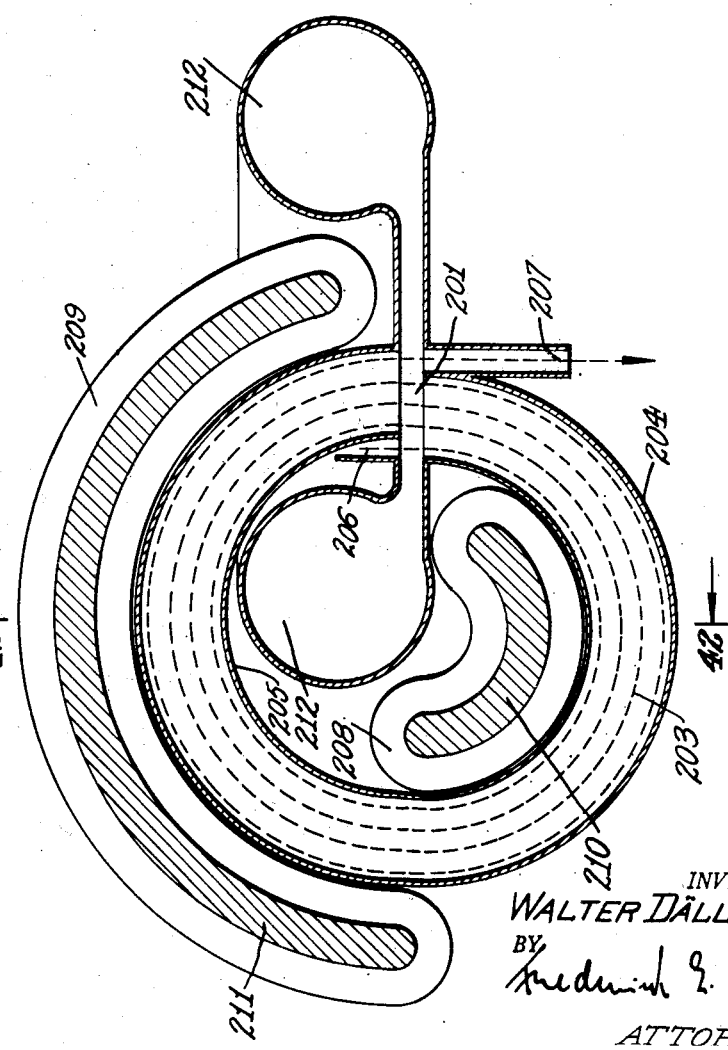

Aug. 7, 1951 W. DALLENBACH 2,563,585
CAVITY RESONATOR APPARATUS FOR GENERATING
HIGH ELECTRIC POTENTIALS
Filed Nov. 9, 1946 32 Sheets-Sheet 24

INVENTOR.
WALTER DALLENBACH
BY Frederick E. Hany
ATTORNEY

Aug. 7, 1951 W. DÄLLENBACH 2,563,585
CAVITY RESONATOR APPARATUS FOR GENERATING
HIGH ELECTRIC POTENTIALS
Filed Nov. 9, 1946 32 Sheets-Sheet 25

INVENTOR.
WALTER DÄLLENBACH
BY Frederick E. Harry
ATTORNEY

Aug. 7, 1951 W. DÄLLENBACH 2,563,585
CAVITY RESONATOR APPARATUS FOR GENERATING
HIGH ELECTRIC POTENTIALS
Filed Nov. 9, 1946 32 Sheets-Sheet 26

INVENTOR.
WALTER DÄLLENBACH
BY
Frederick E. Henry
ATTORNEY

INVENTOR.
WALTER DÄLLENBACH

Aug. 7, 1951    W. DÄLLENBACH    2,563,585
CAVITY RESONATOR APPARATUS FOR GENERATING
HIGH ELECTRIC POTENTIALS
Filed Nov. 9, 1946    32 Sheets-Sheet 28

INVENTOR.
WALTER DÄLLENBACH
BY
Frederick E. Hany
ATTORNEY

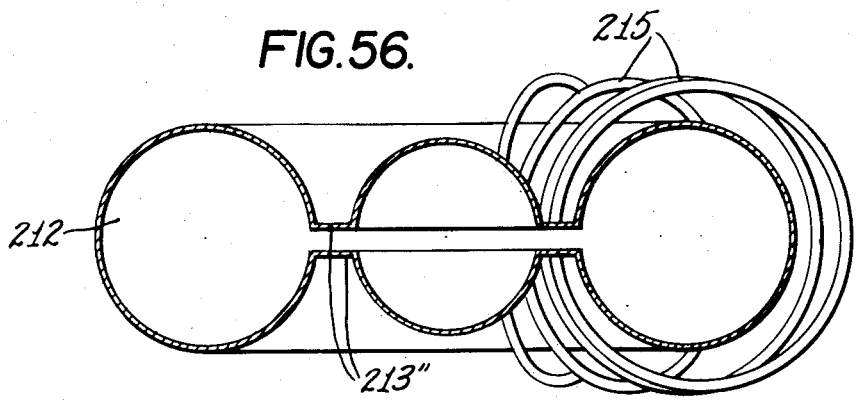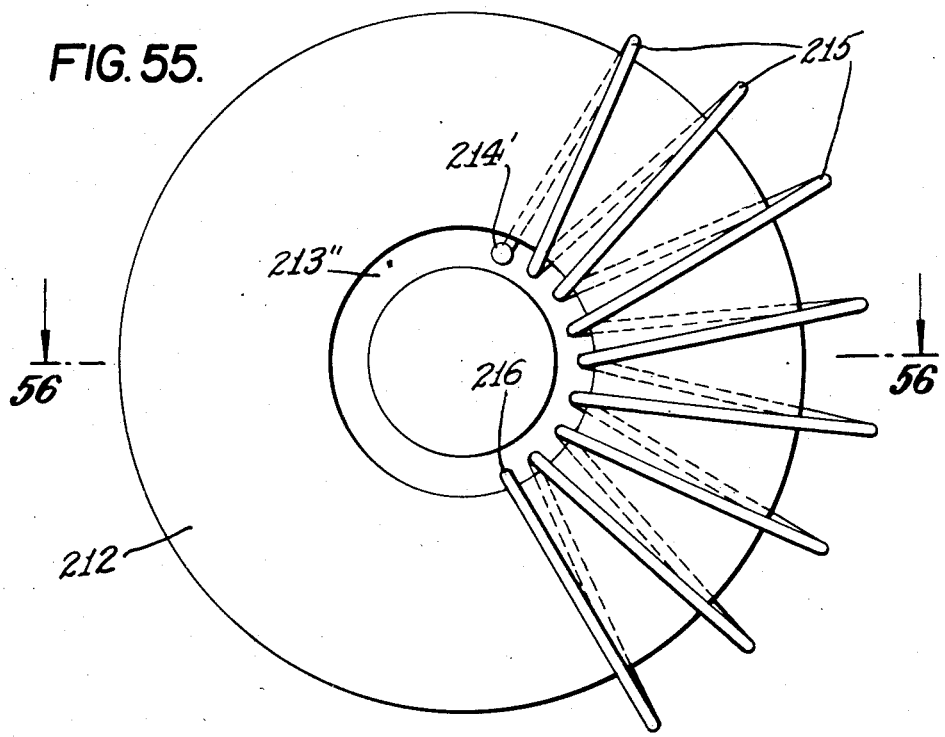

Aug. 7, 1951 W. DÄLLENBACH 2,563,585
CAVITY RESONATOR APPARATUS FOR GENERATING
HIGH ELECTRIC POTENTIALS
Filed Nov. 9, 1946 32 Sheets-Sheet 31

INVENTOR.
WALTER DÄLLENBACH
BY
*Frederick E. Harris*
ATTORNEY

INVENTOR.
WALTER DÄLLENBACH
BY
ATTORNEY

Patented Aug. 7, 1951

2,563,585

UNITED STATES PATENT OFFICE 2,563,585

CAVITY RESONATOR APPARATUS FOR GENERATING HIGH ELECTRIC POTENTIALS

Walter Dällenbach, Zurich, Switzerland

Application November 9, 1946, Serial No. 708,869
In Switzerland October 8, 1945

Section 1, Public Law 690, August 8, 1946
Patent expires October 8, 1965

13 Claims. (Cl. 315—5)

This invention relates to apparatus adapted to generate high electric potentials, and more particularly to spiral accelerators for electrically charged particles wherein an electric oscillation or oscillatory circuit comprising capacitance and inductance is excited in the neighborhood of its natural frequency by a radio-frequency potential brought in couping relation, for instance by way of the inductance. If designed to insure sufficiently low loss, such an oscillation circuit is capable of gradually building up to extremely high amplitudes. An apparatus of this nature designed to generate high electrical potential is known as a Tesla coil or transformer.

One object of this invention is a novel and improved apparatus of the general type above referred to in which the Tesla transformer has been perfected by using a cavity resonator as oscillation circuit. This has the following advantages:

(1) Inasmuch as a cavity resonator, if of accurate dimensions and having an inner surface with high conductivity, is particularly low in losses, it is possible to insure by the same especially high amplitudes of the radio-frequency potential, for a given loss of input.

(2) The electric field being of high potential and high frequency is strictly confined to the inner space of the cavity resonator; in other words, the surroundings of the apparatus for generating high electrical potential are perfectly screened from electrical fields of high potential and high frequency.

If the field intensity or potential gradient prevailing at the inner surface of a high-vacuum cavity resonator attains values of 100,000 v./cm. or, better still, values of 200,000 v./cm. and over, it has been found that highly undesirable auto-electronic discharges, or even flashovers, will occur if the inside surface is made of gold, silver or copper which are materials employed to advantage to obtain a low-loss construction of cavity resonator.

It is a further object of the invention to eliminate the said disturbing actions by protecting the inner surface in zones where high electric field intensities prevail, either by an insulating coat such as glass or ceramic substances or else by making the said zones of metal such as tungsten, molybdenum or chromium which combine adequate conductance with high strength to resist intense electric fields.

For the purpose of insuring low losses, a cavity resonator of the simplest possible construction, that is, comprising only one potential or voltage antinode, and only one, or, at most two current loops or antinodes will prove most favorable.

To obviate constructional complications within the potential antinode zone which require particular attention to insure resistance to high electric field intensities, it is preferable to establish a coupling relationship for the high-frequency energy serving to excite the electromagnetic oscillations inside a current antinode zone.

A now preferred embodiment of the invention embodying all of the features essential to attain the desired ends is to provide a spiral accelerator comprising a cavity resonator including a vacuum vessel, a source of high frequency coupled with the resonator in the zone of a current antinode for generating in the resonator electromagnetic oscillations with approximately the natural frequency of the resonator and for energizing an electrical field of high frequency and high potential amplitude in the zone of a potential antinode of the resonator, a source for generating electrically charged particles connected with the resonator for directing a current of particles into the vacuum vessel, a plurality of guide channels for guiding particles through a definite orbit from said source of particles to a target, said guide channels being disposed outside the vacuum vessel in communication with the vacuum, the zone of the vacuum vessel in which said electrical field of high potential is generated forming gaps in the guide channels which gaps during operation are successively traversed by particles traveling through the guide channels from the particle source to the target, thereby causing the particles to traverse the resonator several times in the zone of a potential antinode, and electromagnetic means encompassing each of said guide channels for producing individual magnetic fields spacially inhomogeneous in direction and strength and invariable as to each moment of time, each of said fields traversing the respective guide channel for guiding and focusing particles traveling through said channel.

Other and further objects, features, and advantages of the invention will be set forth hereinafter, and the novel features thereof defined by the appended claims.

In the accompanying drawing several now preferred embodiments of the invention are shown by way of illustration and not by way of limitation.

Fig. 1 shows a sectional side view of a high-vacuum cavity resonator presenting rotation symmetry and adapted to the generation of high electric potentials.

Fig. 2 is a sectional plan view taken on line 2—2 of Fig. 1, with the cover of the tank of the cavity resonator being removed.

Fig. 3 is an elevational view, partially in section, of the upper half of a capacitor forming part of the cavity resonator.

Fig. 4 is a plan view and fractional section of Fig. 3 along line 4—4.

Fig. 4a shows a fractional side view of Fig. 4.

Figs. 7a to 7i show different circuit systems of a transmitter tube adapted to energize the cavity resonator.

Fig. 8 is a sectional side view of a structural design of a circuit system according to Fig. 7d, the section being taken along line 8—8 of Fig. 9.

Fig. 9 is a section along line 9—9 of Fig. 8.

Fig. 10 is a section along line 10—10 of Fig. 8.

Fig. 11 is a section along line 11—11 of Fig. 8.

Fig. 13 is a sectional diagrammatic side view of a cavity resonator according to the invention adapted to one-stage acceleration of electrically charged particles.

Fig. 14 shows a one-step or single-stage accelerator comprising the use of direct potential for the acceleration of electrically charged particles.

Fig. 15 shows a modification of Fig. 14 concerning the acceleration of particles.

Fig. 16 shows the details of an electron beam emitter or gun of the kind as used in Figs. 13, 14 and 15.

Fig. 17 shows the details of a second electron beam source or emitter as used in Fig. 14.

Fig. 18 is a detail view of a modification of a positive ion beam source.

Fig. 18a is a time chart of a D.-C. pulse potential.

Fig. 18b is a time chart of a radio-frequency potential.

Fig. 19 is a detail view of still another modification of a source of a positive ion beam or pencil.

Figure 25:
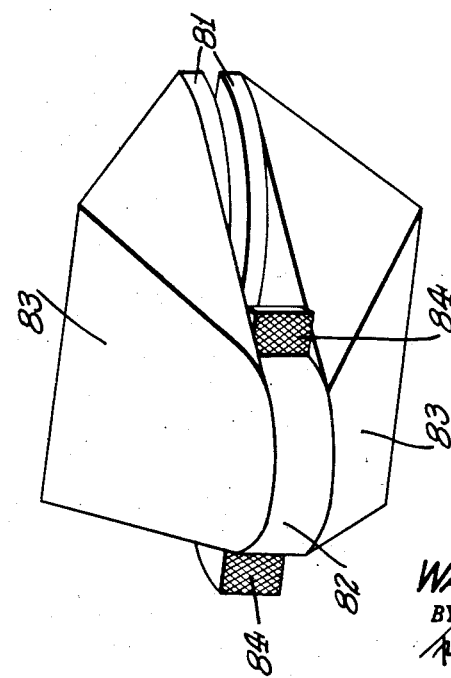

Fig. 25 in similar representation shows the corresponding magnet system.

Fig. 26 is a sectional side view of a multiple accelerator according to the invention in which discrete guide-channels rather than dees are provided for the guiding of particles.

Fig. 26a is a section taken on line 26a—26a of Fig. 26, the magnet system being omitted.

Figure 27:
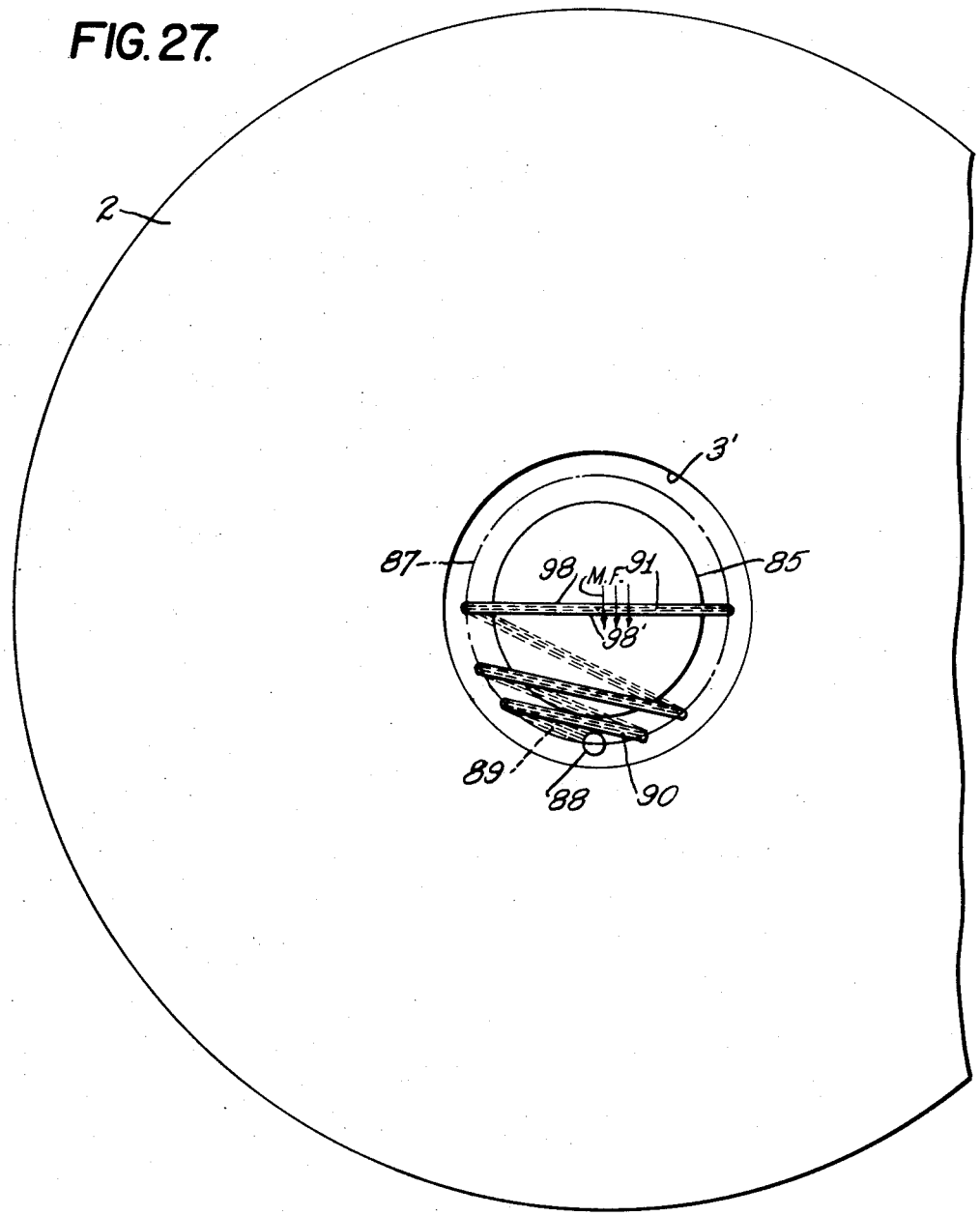

Fig. 27 is a plan view of Fig. 26.

Figs. 28–32 show diagrammatically different guide-channel arrangements.

Figure 33:
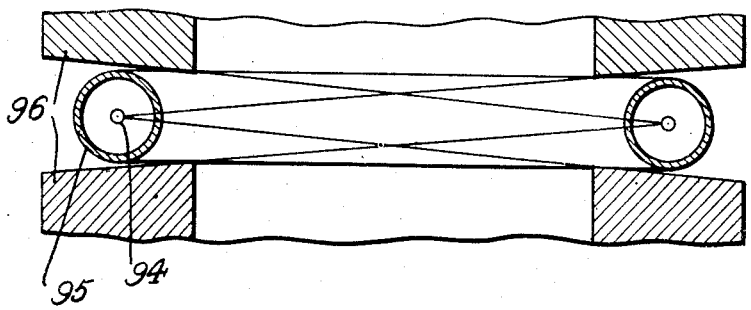

Fig. 33 shows the arrangement of a tube-shaped guide-channel between magnetic pole shoes.

Fig. 34 is a side view, partially in section, of the structural arrangement of an individual guide-channel.

Fig. 35 is a plan view of Fig. 34.

Fig. 36 is an exploded view of part of a guide-channel with the corresponding magnet systems.

Fig. 36a is a circuit diagram for the coils of the magnet systems.

Figure 37:
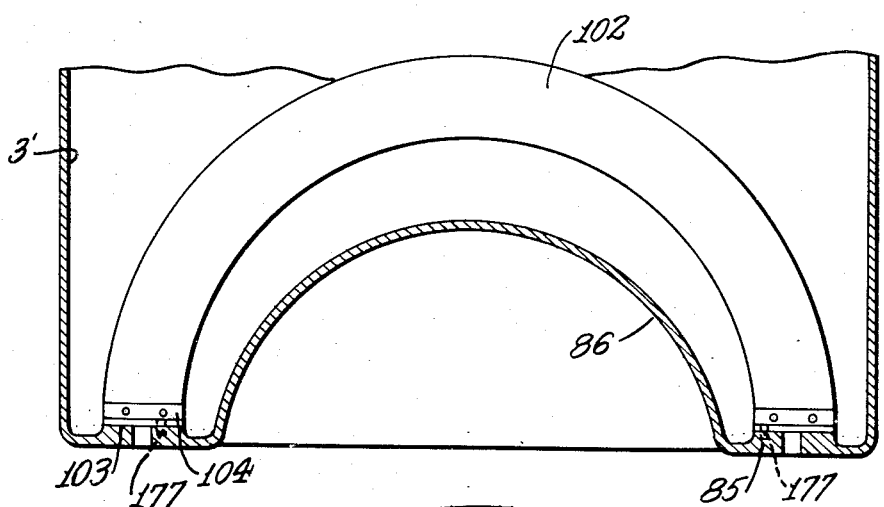

Fig. 37 is a side view of a capacitor electrode with the corresponding guide-channels attached thereto.

Figure 38:
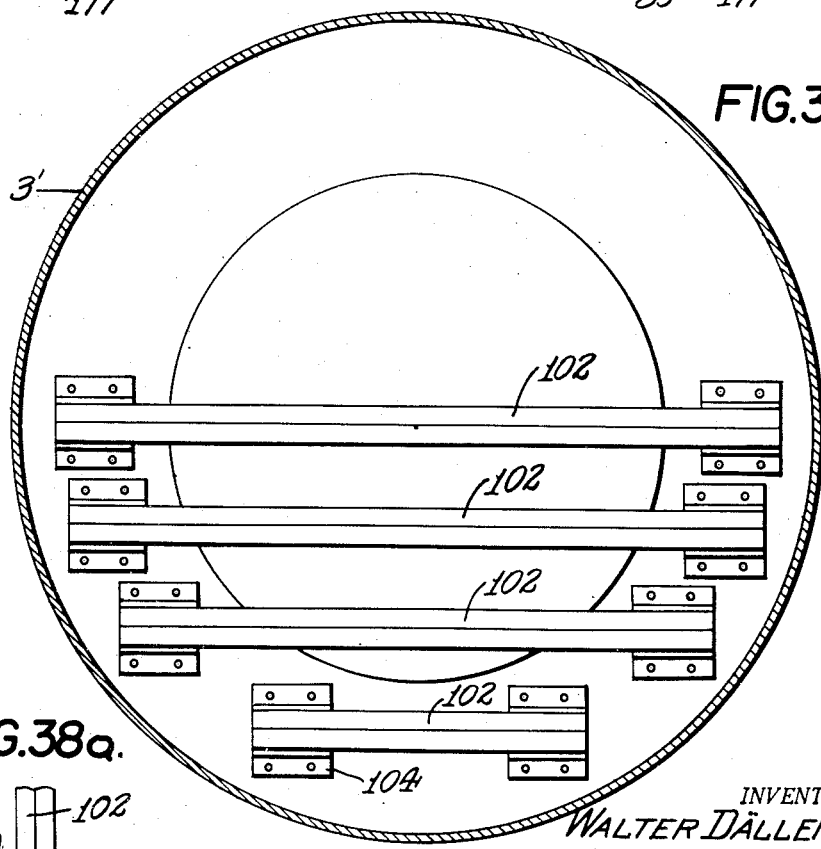

Fig. 38 is a plan view of Fig. 37.

Figure 38A:
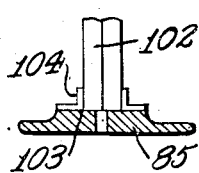

Fig. 38a is a sectional side view of a detail of Fig. 37.

Fig. 39 shows a sectional side view of a multiple accelerator with a plurality of guide-channels and the magnet systems thereof.

Fig. 40 is a section taken along line 40—40 of Fig. 39.

Fig. 41 is a sectional side view of a modification of a multiple accelerator of the type shown in Fig. 39.

Fig. 42 is a section taken along line 42—42 of Fig. 41.

Figure 43:
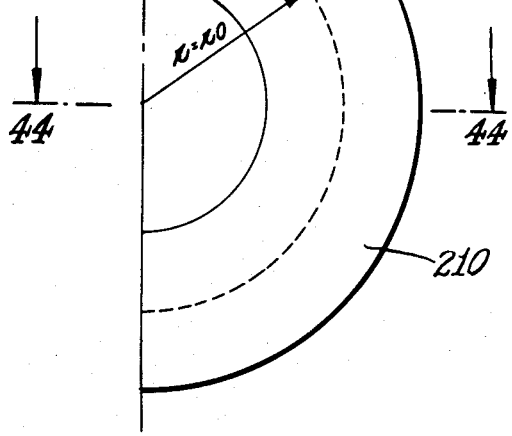

Fig. 43 shows a plan view of the pole faces of the magnet system of a guide-channel.

Figure 44:
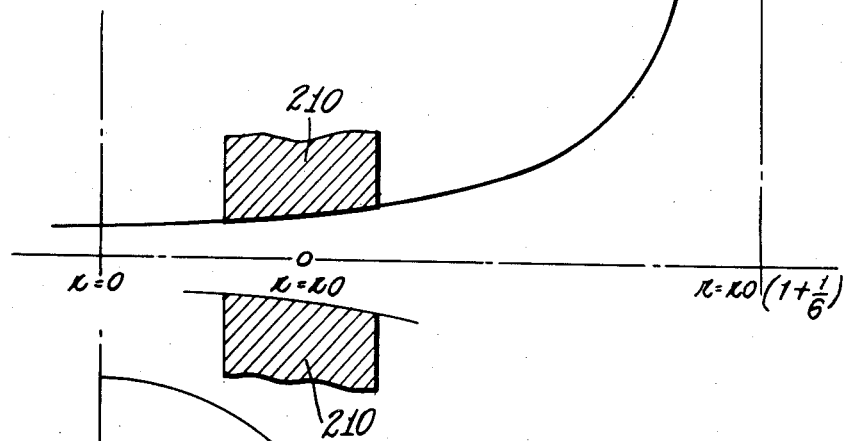

Fig. 44 is a section taken along line 44—44 of Fig. 43.

Figure 45:
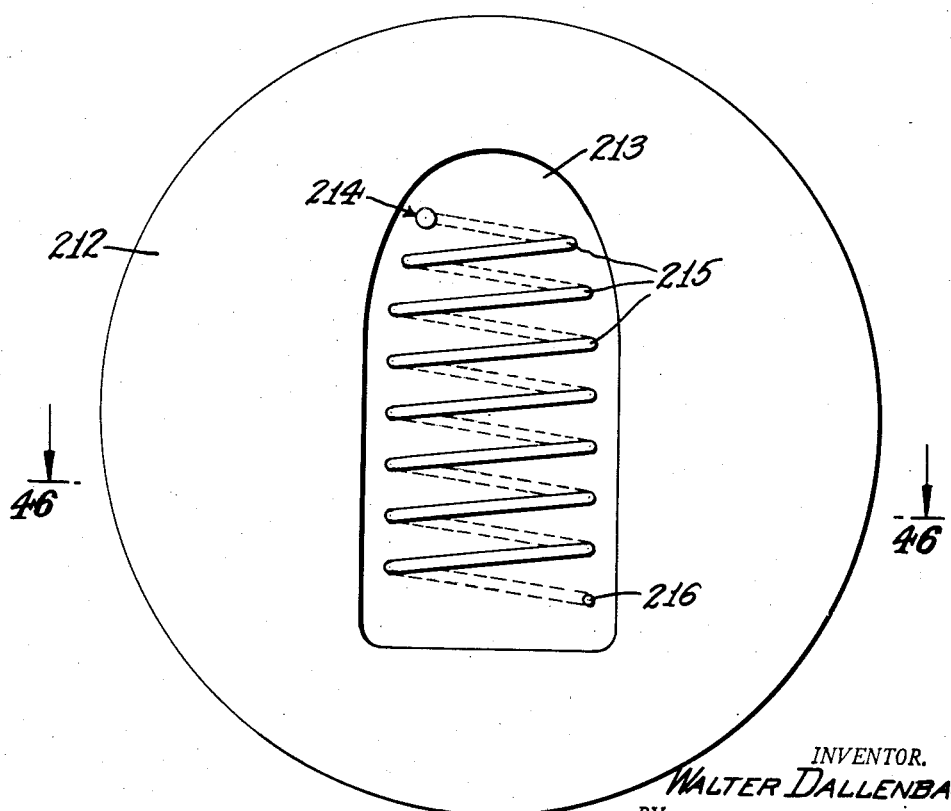

Fig. 45 is a plan view of a multiple accelerator as disclosed and adapted to particles of a velocity approaching that of light, comprising single guide-channels and two acceleration stages for each turn thereof.

Figure 46:
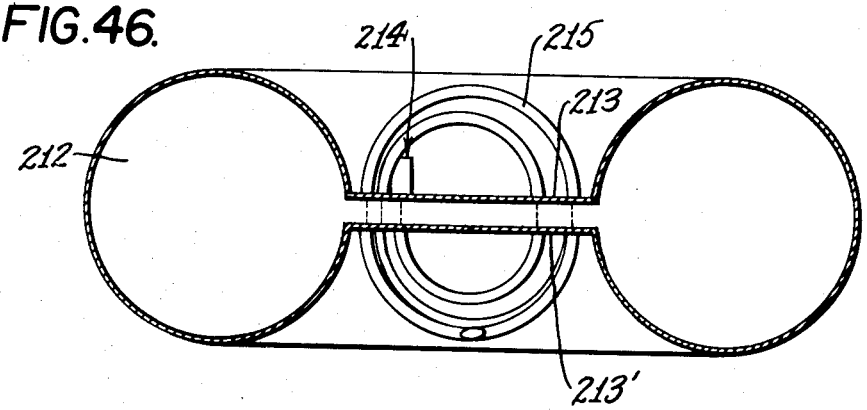

Fig. 46 is a section along line 46—46 of Fig. 45.

Figure 47:
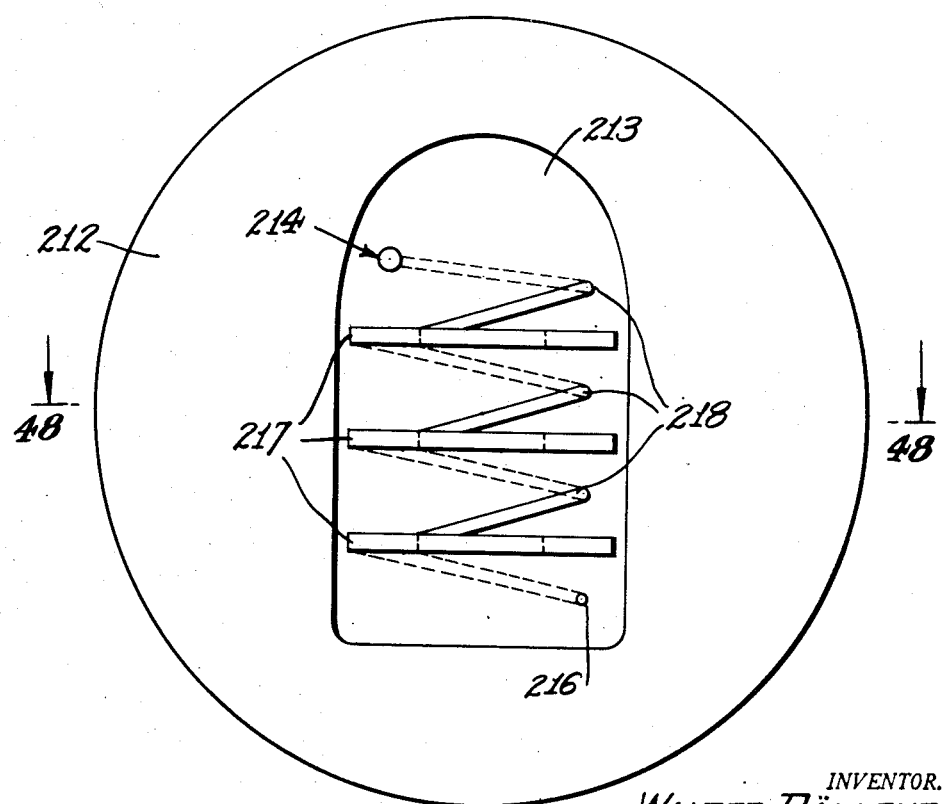

Fig. 47 shows a plan view of a similar apparatus as in Figs. 45 and 46, but with multiple guide-channels.

Figure 48:
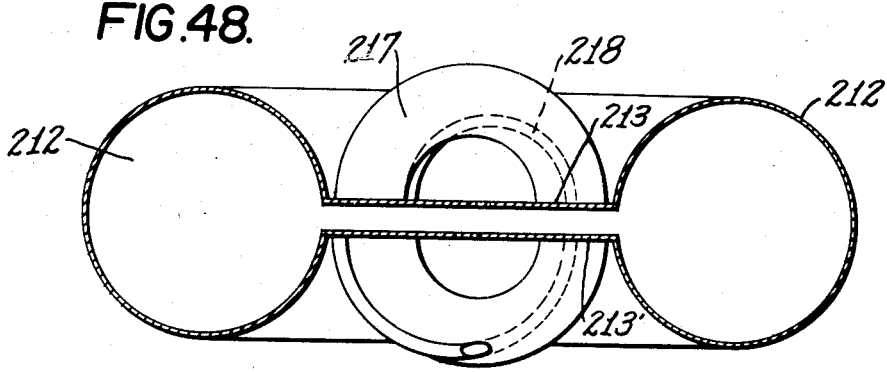

Fig. 48 is a section along line 48—48 of Fig. 47.

Figure 49:
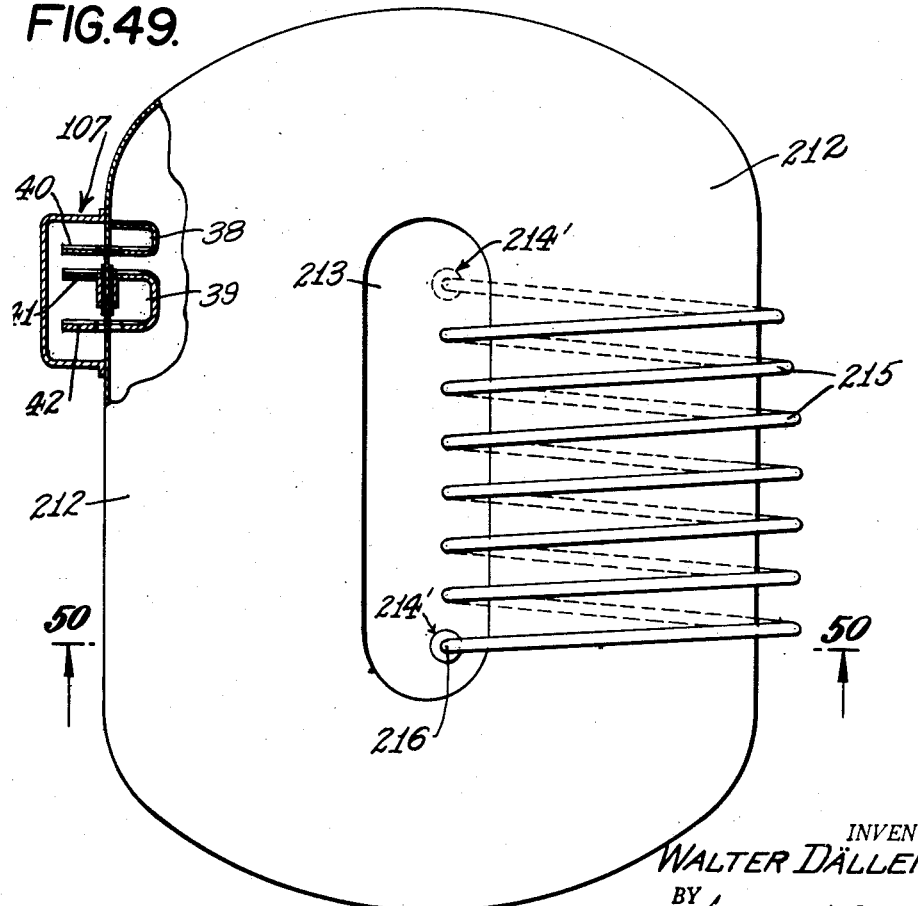

Fig. 49 is an elevational side view of a modified embodiment of a multiple accelerator for particles near light velocity, but comprising only one accelerator stage per turn.

Figure 50:
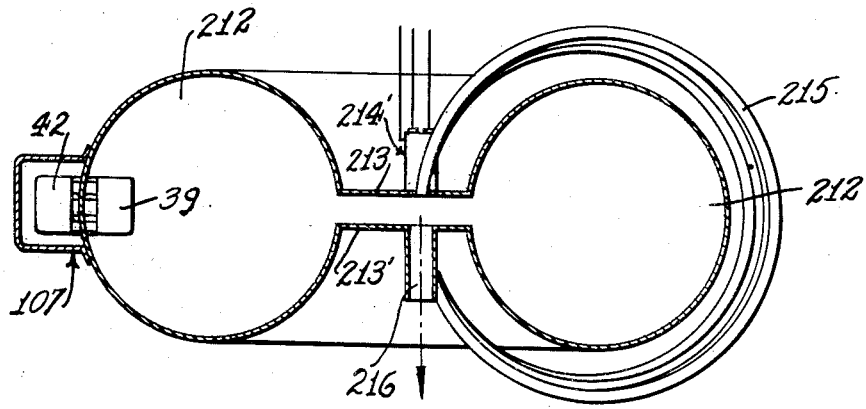

Fig. 50 is a section along line 50—50 of Fig. 49.

Figure 51:
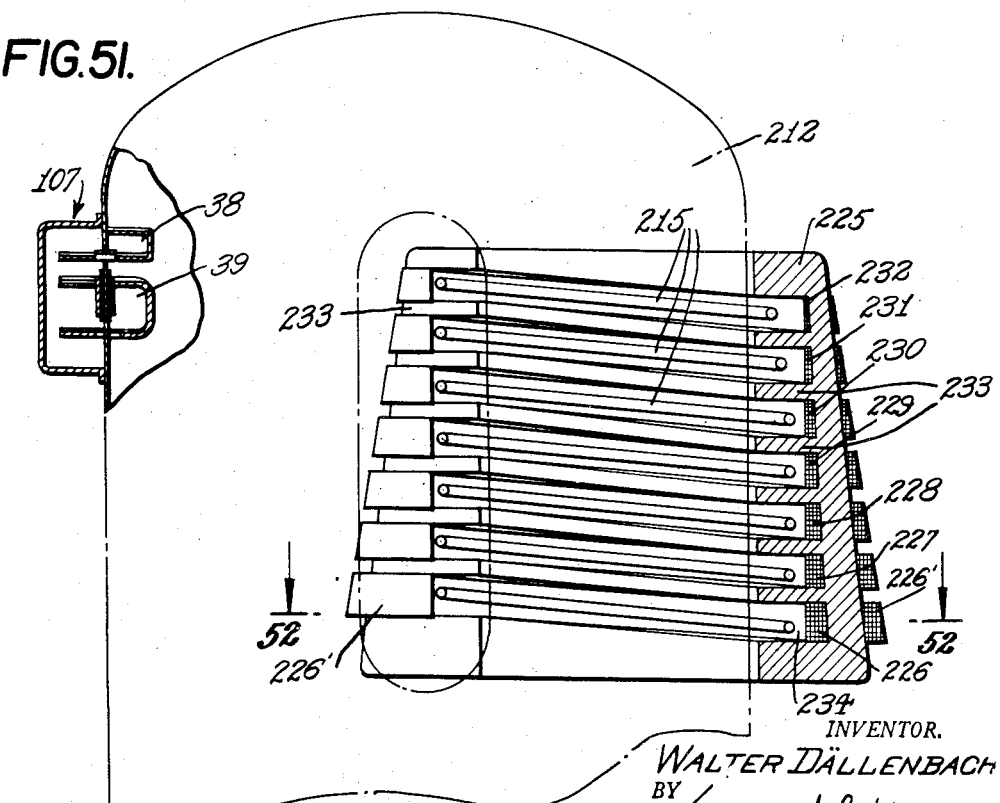

Fig. 51 is a partial side view of the magnet systems of a multiple accelerator as shown in Fig. 49, the cavity resonator being indicated by dash-dot lines.

Figure 52:
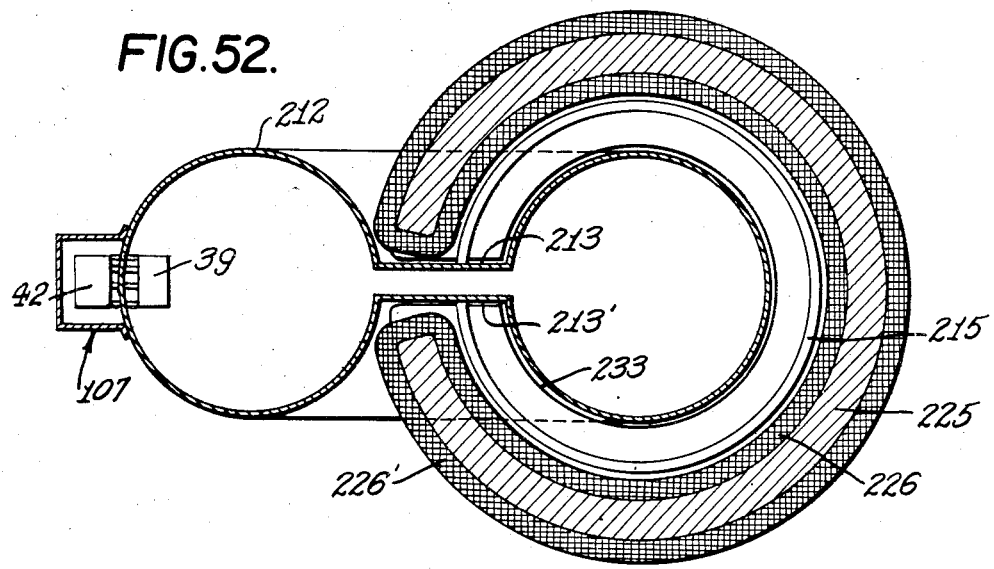

Fig. 52 is a section along line 52—52 of Fig. 51.

Figure 53:
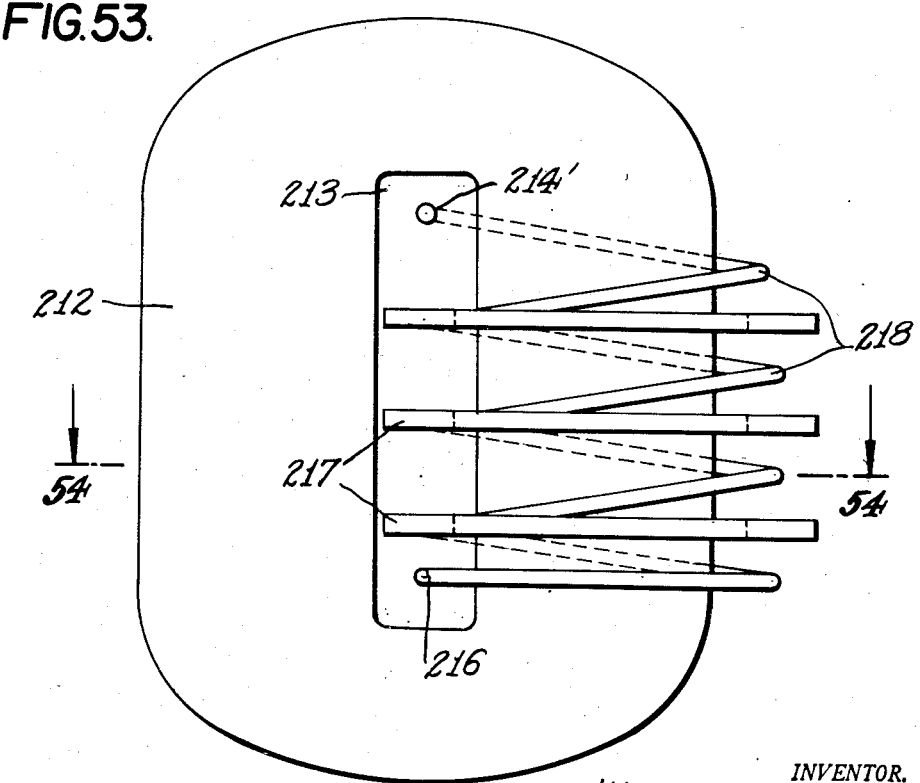

Fig. 53 is an elevational side view of a modification of the embodiment according to Figs. 51 and 52.

Figure 54:
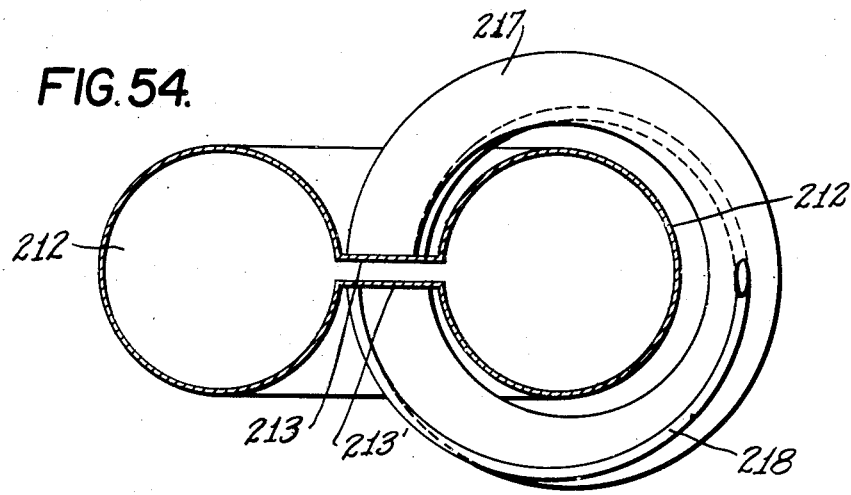

Fig. 54 is a section along line 54—54 of Fig. 53.

Fig. 55 is an elevational side view of a modification of Figs. 49 and 50.

Fig. 56 is a section along line 56—56 of Fig. 55.

Figure 57:
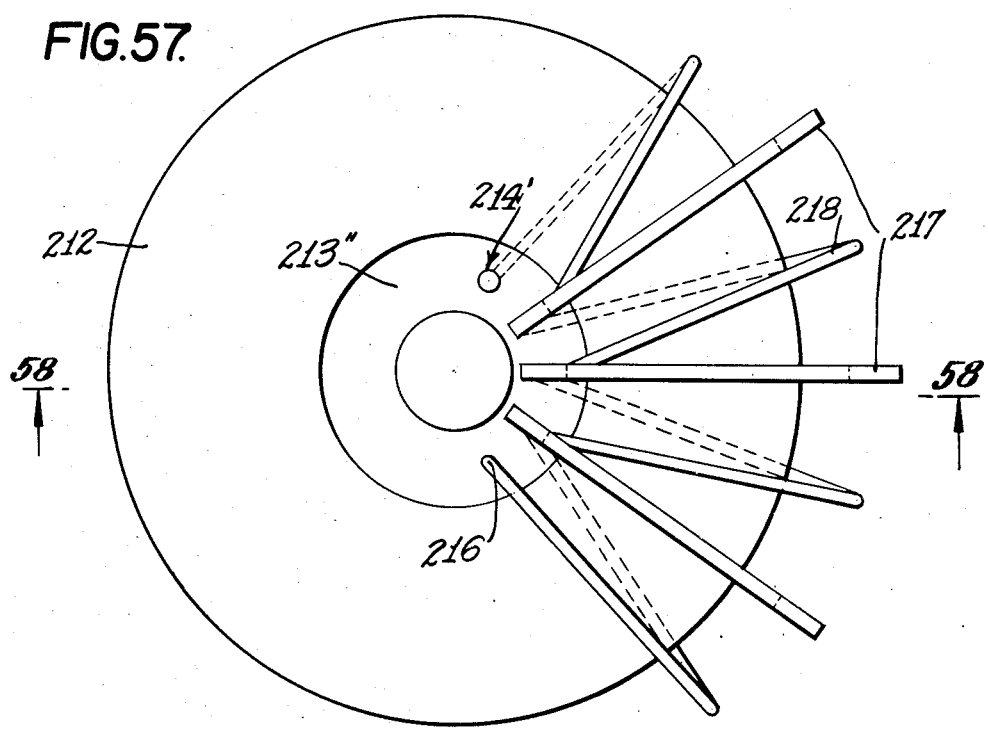

Fig. 57 is an elevational side view of still another modification of Figs. 49 and 50.

Figure 58:
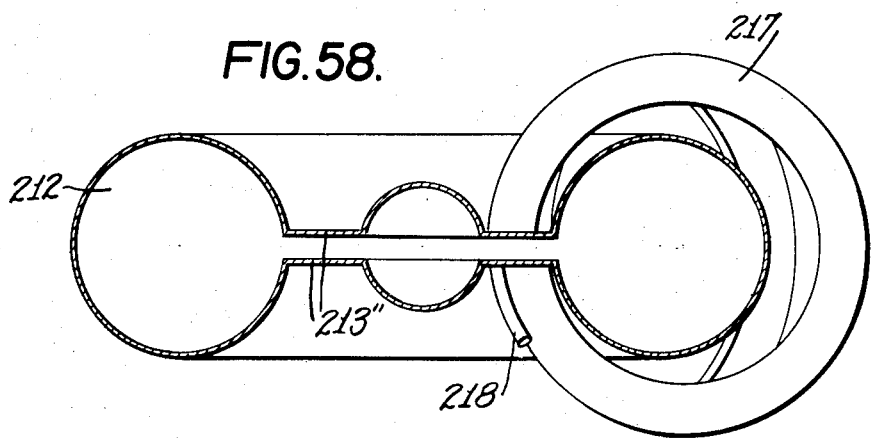

Fig. 58 is a section along line 58—58 of Fig. 57.

Figure 59:
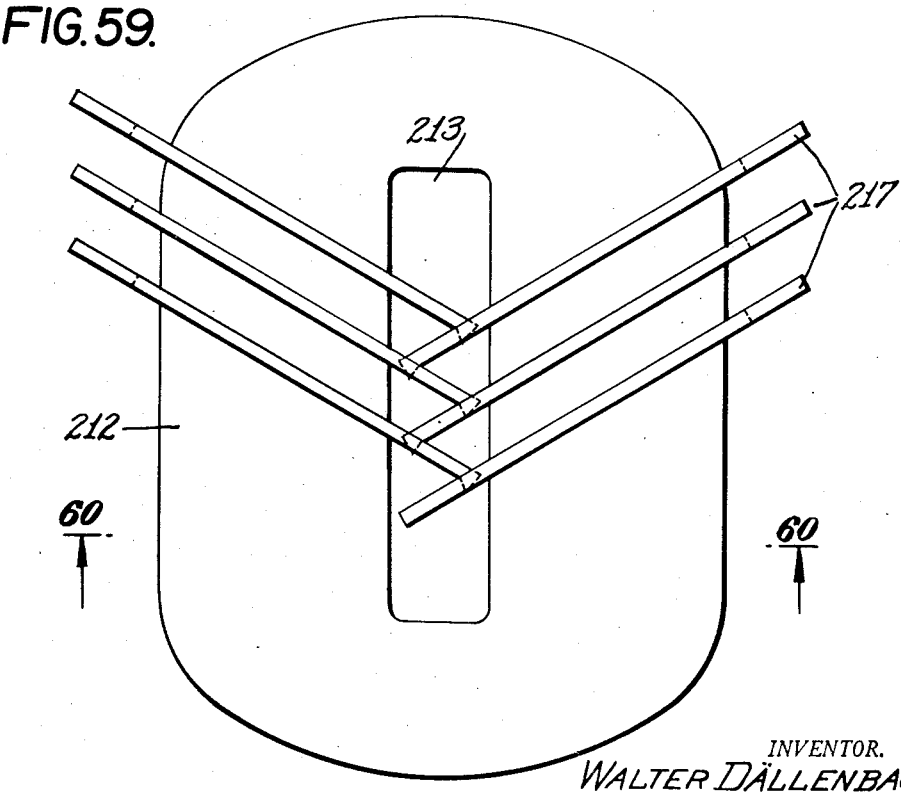

Fig. 59 is an elevational side view of another modification of Figs. 53 and 54.

Figure 60:
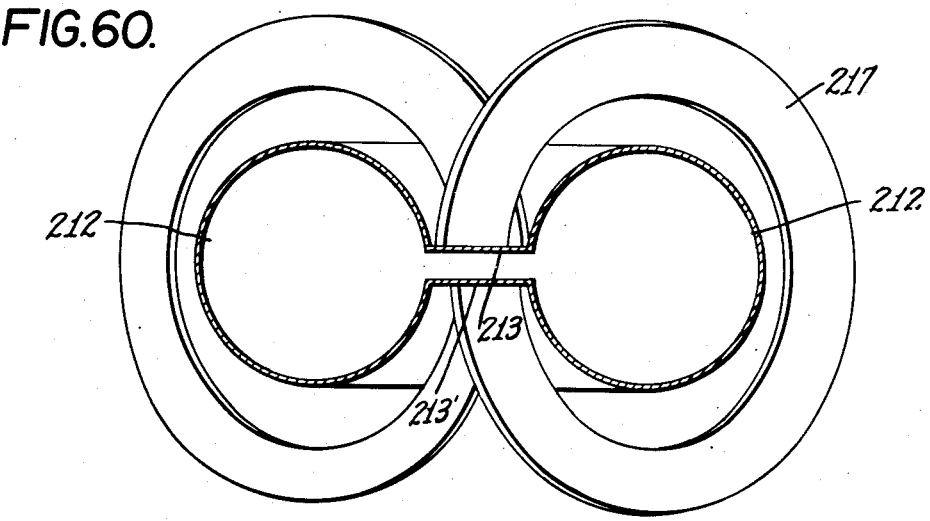

Fig. 60 is a section along line 60—60 of Fig. 59.

Figure 61:
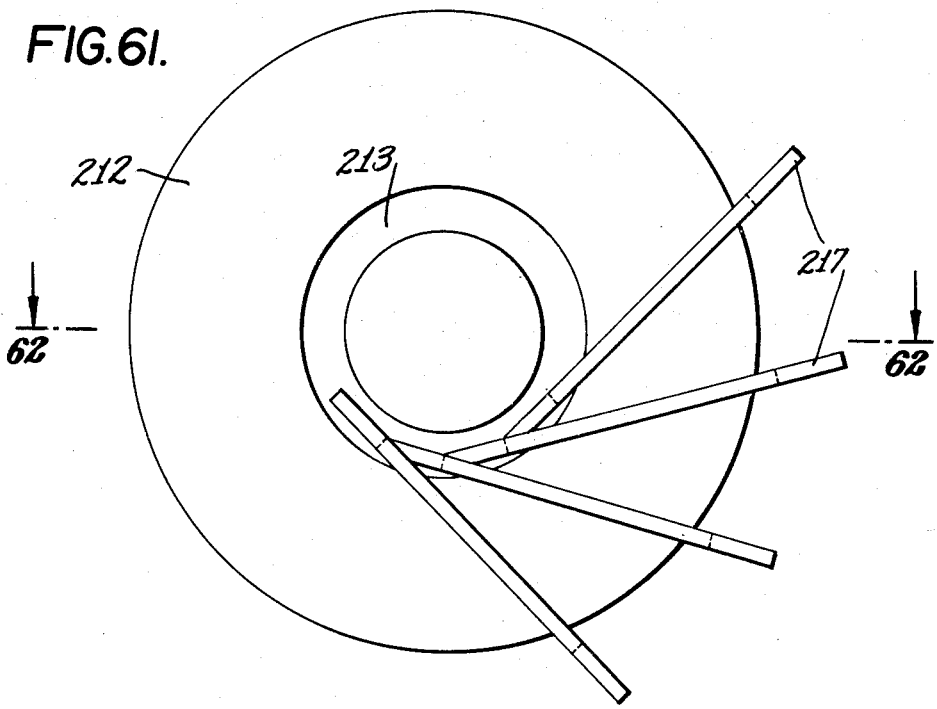

Fig. 61 is an elevational side view of another modification of Figs. 57 and 58.

Figure 62:
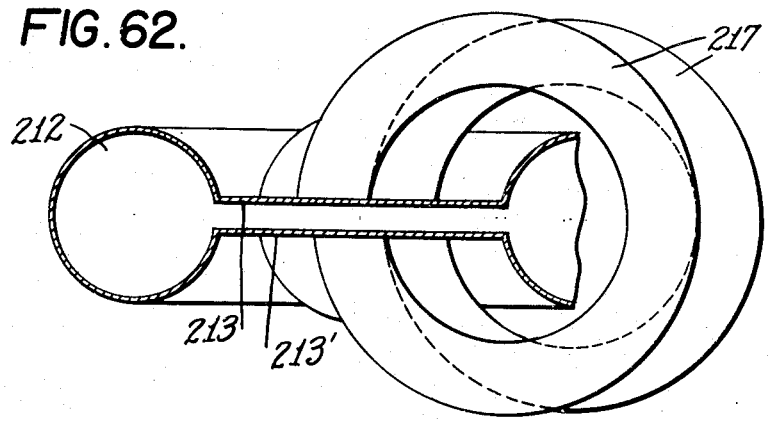

Fig. 62 is a section along line 62—62 of Fig. 61.

Referring now to the figures in detail, Figs. 1 and 2 show as a first exemplified embodiment a Tesla transformer comprising a high-vacuum cavity resonator, more particularly a rotation symmetry cavity resonator, which is adapted to the generation of high electric potential. Inside a circular cylindrical vacuum vessel or tank with cover 2, there are fitted co-axially projections 3 also of circular cylindrical shape. These projections, facing each other, are the two electrodes of a capacitor arranged within a potential antinode over which the electrical potential to be produced arises. The remaining toroidal space 1' interiorly of the cavity resonator contains the high-frequency magnetic rotary or rotating field and forms the inductance of the oscillation circuit. Upon the cylindrical shell of vessel or tank 1 in the median or equatorial plane of the arrangement is the current antinode of the resonator extending over a circular line.

Because of the high electric field intensities arising thereon, the edges or rims of the capacitor halves 3 placed opposite each other are properly rounded or curved. In order to boost the breakdown or flashover strength between the two capacitor halves 3, the field space of the capacitor is uniformly subdivided by three circular, flat metal disks or screens 4, 5, 6. Disk or screen 4 is attached by three supporting arms 7 to the bottom of vessel 1, disk 5 by three arms 8 to the cylindrical shell of the tank and disk 6 by three arms 9 to cover 2. All of said supporting arms 7, 8, 9 may be made of metal so that the disks 4, 5, and 6 will be in conducting relationship with the wall of the cavity resonator. One condition is that the arms within the toric space 1' constituting the inductance should be so positioned that the high-frequency magnetic rotary field will just induce the potential in the screen disks which corresponds to their positions within the field space of the capacitor. In so far as arms 8 are concerned, the said condition is readily satisfied, for these are disposed in the equatorial plane. Support arms 7 will be in the proper position if one-quarter of the magnetic flux inside the toric space crosses below, and therefore three-quarters above. A similar situation applies to arms 9. What is important is that the means designed for the generation of high electric potentials, including the subdivision of the field by the three screens 4, 5, 6, require no insulation material at all. This is a substantial advantage because of the fact that insulators are often the cause of difficulties wherever high potentials are used. It will be understood that screen disks 4, 5, 6, supported by arms 7, 8, 9, could also be insulated from the wall or shell of the cavity resonator for the impression of special potentials, say, D.-C. potentials.

The entire inner surface of the cavity resonator, with the exception of the cap of the two capacitor halves 3 extended as far as indicated by the boundaries 10, consists of gold, silver or copper to a depth greater than 1.6 times the depth of penetration, or more particularly equal to 1.6 times the depth of penetration of the surface or skin currents. As a result of this step, the only losses which arise, namely, Joule effect losses can be minimized. It is to be noted that if the high-conductance surface layer has a thickness equal to 1.6 times the depth of penetration, the losses will be of a minimum value; in fact, they are about 8 percent lower than in the case of a very thick high-conductance layer as can be readily demonstrated by calculation.

From the viewpoint of minimizing joulean losses, it is also desirable to choose the cross-section of the toroidal space forming the inductance substantially or roughly circular, or else, as shown in Figs. 1 and 2, roughly square. For, in such cases current lines embracing the aggregate high-frequency magnetic flux will be of minimum length, and thus the losses will be low.

As to the caps or covers of the two capacitor halves 3, and of the three screen disks 4, 5, and 6 which are also located in the zone of high electric field intensities, the use of surfaces made of metals of the highest possible electric conductance may be dispensed with. In fact, metals such as tungsten, molybdenum or chromium which distinguish themselves by high resistance to intense electric fields and give least cause to auto-electronic discharges or electric flashovers are most suitably chosen.

The construction of the top capacitor half 3 is shown in more detail in Figs. 3, 4 and 4a. Connected with cover 2 in a way so as to insure high-vacuum tightness is a cup-shaped receptacle 11, by means of a yielding wall portion having the form of a corrugated tube 12. The latter bears against the cover 2 with three claws 13 and set screws 14 designed to absorb the atmospheric pressure acting upon cup 11. The corrugated tube 12, the three set screws 14 and three additional set screws 15 with abutments 16 welded to cover 2 make it feasible to precisely adjust the upper capacitor half shown in Fig. 3 relative to the other half of the capacitor. This is of practical advantage in some instances, for example, whenever it is necessary to position the two capacitor halves in more perfect parallelism and more exactly coaxially than is normally feasible within the limits of tolerance practical in making a large vacuous vessel or tank vessel for a cavity resonator.

Cover 2, corrugated tube 12, and a ring 17 firmly welded to the receptacle 11, with the corrugated tube 12 being welded or soldered to the said ring so as to insure just as high-vacuum tight a joint as with the cover 2, are all provided upon their inner surfaces turned towards the vacuous space with a coat such as gold or silver or copper insuring high electric conductance. Entirely inside the vacuous space a cap 18 extended as far as the boundary line 10 is fitted by a bayonet joint, as can best be seen on Figs 4 and 4a, upon the receptacle 11, said cap 18 having a surface layer consisting of tungsten, molybdenum or chromium possessing sufficient resistance against high electric field intensities. United with cap 18 is a ring 19 and a collar 20 attached thereto. The said ring projects inwardly somewhat beyond the collar 20. It serves for centering the cap 19 upon the receptacle 11. On the inner edge of the ring 19 and in the collar 20 there are provided twelve circumferential recesses 21 which are equally spaced apart and which make it possible to shift cap 18 over twelve pins 22 welded or soldered on the receptacle 11 so that by a turn of an angle of 15 degrees the cap 18 is brought to bear upon the twelve pins by means of the ring 19. When in this position, a coil spring 23 with closely wound spires or threads rests in the circular groove formed by the upper end of the cap 18, ring 19, and collar 20 so that it will fill the said groove throughout and is compressed in a direction at right angles to its axis. The said spring which is made from tungsten, molybdenum or bronze wire will thus make, throughout the circumference of boundary 10, perfect conductive contact with each of its spires between the zone formed by parts 2, 12, 17, having a high-conducting surface and zone formed by parts 18, 19 having a surface insuring resistance to high electric field intensities.

The provision of a conductive connection between the zone having an inner surface of high electric conducting power and the zone resistant to high electric field intensities is practically imperative. The use, say, of a capacitive connection or coupling by means of blocking capacitors disposed along boundaries 10 would be hardly feasible. At these blocking capacitors, which would have to carry the entire electric flux between the two halves of the capacitor 3, there would arise higher electric field intensities than in the potential antinode of the cavity resonator itself, at least as long as the surface of the blocking capacitors is not larger than the active surfaces of the capacitor halves 3. Such form of construction would be difficult to realize in practice.

The same construction designed to insure uniform conductive connection along the whole circumference for the passage of high-frequency surface currents must be provided also between the detachable cover 2 and the cylindrical tank 1. A coil spring similar to spring 23 is suitable.

The vacuum inside the evacuated vessel 1 is maintained by a conventional type of a high-vacuum pump 26. The latter is connected with the toric space 1' of vessel 1 by means of a pump connecting nipple or intake 27, preferably in the neighborhood of the current antinode, at any rate in the toroidal space of the cavity resonator remote from the potential antinode. In this way, disturbances inside the zone of high electric field intensities are avoided. However, the connecting cross-section of the pump nipple or intake 27 means a disturbance in the flow of surface currents interiorly of the cavity resonator. This difficulty which results in an increase in joulean heat losses may be obviated by inserting into the said cross-section of the pump intake 27 a grid formed by parallel rods or a sheet with slots as at 28. These rods or slots are placed parallel to the current lines of the surface currents. The high-vacuum pump is most conveniently of the oil-diffusion type. In many instances, as long as the apparatus is operating, this pump must be permanently running. Numeral 29 denotes a heated oil container, 30 are connections for circulating water for cooling, and 31 the pipe to the low-vacuum produced by an auxiliary vacuum pump 105 of conventional design. Heating of oil reservoir 29 is effected by a heating resistor 106 connected to a source of current 107.

The cavity resonator is fed from a triode transmitter within the zone of the current antinode. The latter, generally designated by 107, shall be described in detail by reference to Figs. 8 to 11.

To provide the required insulation strength, of the cavity resonator inside the zone of the potential antinode, certain forming procedures are necessary prior to, and on starting operations. For carrying out the forming procedure, all the inside surfaces of the cavity resonator should be painstakingly cleaned, as it is also necessary to create proper vacuum pumping conditions. Moreover, for purpose of degassing the apparatus must be heated, if possible, to several hundred degrees centigrade. Finally, such zones of the inside surface exposed to intense electric fields should be heated to incandescence. This is accomplishable in a particularly simple and efficient way by filling the interior of the cavity resonator with a mixture consisting of two parts argon and one part hydrogen gas at a pressure of about 20 millimeters Hg column, this being done after the first examination and degassing of the surface by heating. Inside this atmosphere, a glow discharge is caused to pass between the whole inside surface of the cavity resonator acting as the cathode and an auxiliary anode protruding into the cavity. The effect of this glow-discharge is two-fold; First, it heats the aggregate inside area of the cavity resonator to high temperatures. It is readily possible to raise the two caps 18 of the capacitor halves 3, the screen disks 4, 5, 6 and the supporting arms 7, 8 and 9 of Fig. 1, to incandescence as all these parts are thermally quite well insulated in comparison with the wall of the cavity resonator in contact with the outside air. Secondly, the bombardment by positive ions will insure thorough cleaning of the entire surface of the resonator. As known from experience, such impurities, as are carried off from the cathode will travel to the anode of the glow discharge by virtue of transport or transfer of matter. This auxiliary anode is so constructed, that after termination of the forming process by the glow-discharge, it can be removed from the vacuous space, preferably by the aid of an airlock so that the vacuum will not be impaired incidentally.

Figure 5:
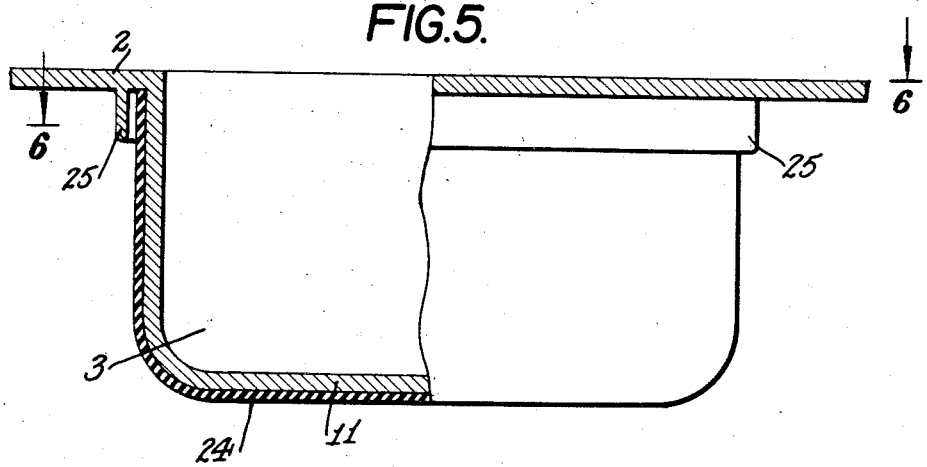
Fig. 5 is a sectional side view of a modification of the capacitor portion as shown in Figs. 3 and 4.
Figure 6:
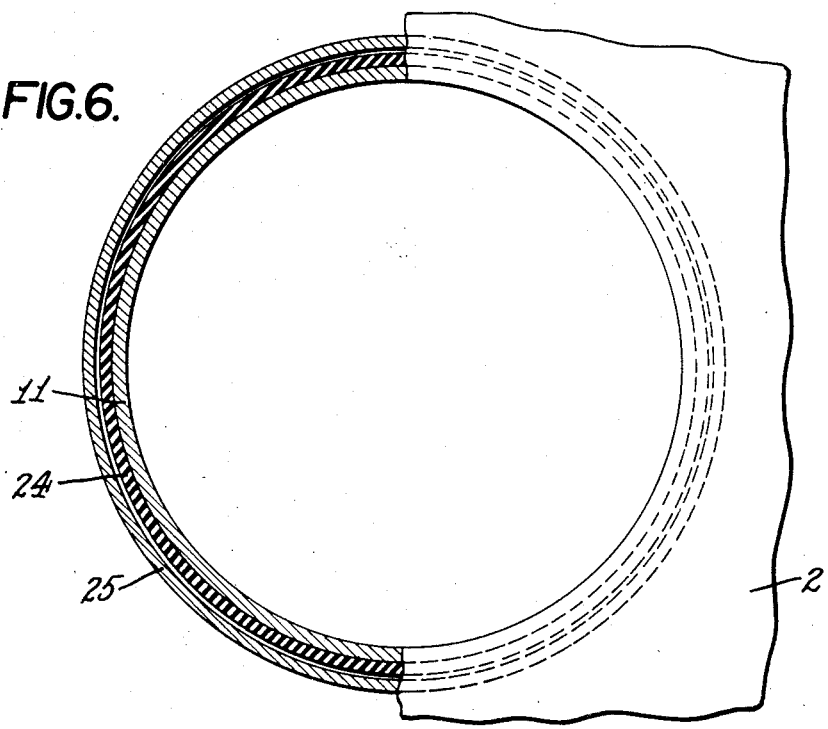
Fig. 6 is a section along line 6—6 of Fig. 5.

Another way of rendering the potential antinode zone resistant to high field intensities is illustrated in Figs. 5 and 6. Connected with cover 2, in a manner resembling that of Fig. 3 though without the interposition of a yielding wall portion is the cup-shaped receptacle 11. The latter, on its surface turned toward the interior of the cavity resonator, has a dense coating 24 consisting of an insulator such as glass or ceramic. Auto-electronic or cold-emission discharges or electric flashovers in the adjoining vacuum space between the two capacitor halves 3 will not be able to form at the said coating 24 as no free movement of electrons is feasible.

The boundary line between insulation material and metallic surface constitutes an area where dangerous electric flashovers are liable to take place across the vacuum gap. As shown in Figs. 5 and 6, said boundary line is efficiently shielded by a metal collar or guard ring 25 against electrical fields. The boundary between insulation material and the metallic surface is shifted by the arrangement of the metallic collar 25 into a space free from electric fields. Collar 25 is positioned as closely as possible to the insulation surface thereof. As a result a high electric or insulating strength is attained, a limitation being imposed by direct electric breakdown of insulation layer 24, more particularly the layer of glass or ceramic. Inasmuch as the potential over the layer of insulation 24 is a high-frequency potential, the insulation preferably consists of material possessing as high as possible a dielectric constant, such as titanium dioxide. The potential required for the passage of the electric flux flowing between the two electrode halves 3 will then be particularly low in the insulation layer. This is of practical advantage, first, because the dielectric losses will be of a low value, and secondly, because electric breakdown of the insulation layer itself is a lesser risk.

Of course, it has to be assumed in this connection that no static charges on the surface of the layer 24 turned towards the interior of the cavity resonator will form, as such static charges would cause D.-C. fields over layer 24 which would become superimposed upon the radio-frequency field. These D.-C. fields may assume values of potential equal to the peak value of the radio-frequency fields which accelerate the particles causing the charges. Assuming that the supply of particles will remain below a certain level or limit, the static charges can be dissipated by an intentionally low ohmic conductance of the insulation layer. Of course, such a step will be limited by such additional losses as result from an intentional ohmic conductance of the insulation layer.

In certain cases, for instance, where the cavity resonator is used in a multiple accelerator of particles having positive electric charge, it is necessary that comparatively low natural frequencies corresponding to wavelengths λ ranging from 20 to 40 meters should be used. This, in turn, necessitates relatively large dimensions of the vacuum tank, that is, the cavity resonator. For the sake of illustration, the following example shall be cited. Calculation shows that for a capacitance $$C = 4\lambda (\mu\mu f.)$$

and a radius of the capacitor halves 3 in Fig. 1.

$$r_i = .02\lambda (m.)$$

the axial length will be $$a = .12\lambda (m.)$$

and the outside radius of the toroidal space $$r_a = .19\lambda (m.)$$

It will be evident that due to the pressure of the outside atmosphere, vessels of this kind require careful mechanical construction. In the first place, the bottom of tank 1 and the cover 2 should be reinforced by ribs. Secondly, both bottom and cover constitute a load on the circumference of the cylindrical shell between them equal to a force $r_a/2$ (in terms of kilogram-centimeters).

One special factor requiring attention in the design is that of the dissipation of joulean heat losses. The cooling of the walls of the cavity resonator in contact with the outer atmosphere is a simple matter. More serious in this regard are the difficulties concerning the screen disks 4, 5, 6 and the supporting arms 7, 8, 9, Figs. 1 and 2. However, it is quite practical to provide hollow arms and disks and to circulate a cooling medium through the same, for instance oil. For energizing the cavity resonator, the same may be used as the frequency controlling resonator of the transmitter tube 107. Figs. 7a to 7i show nine different circuit systems for the direct assembly and combination of a triode transmitter with a cavity resonator.

Referring to Figs. 7a to 7i, the interior of the cavity resonator is assumed to be above wall 1, and below the space facing the outer atmosphere. The high-frequency magnetic field acting interiorly of the toroidal space shall be assumed to be positioned at right angles to the plane of the drawing. In the plane of the drawing, that is to say, at right angles to the magnetic field, are the two current conducting loops 38 and 39. Below the wall is the triode transmitter comprising a cathode 40, a grid 41 and a plate 42. It will be noted that the circuit systems Figs. 7a to 7i differ from one another.

(1) By the particular electrode of the triode which is in short-circuited relation for high frequency with the wall or sheath 1 of the cavity resonator, and (2) By the particular electrode of the triode which is in conducting connection with wall 1 of the cavity resonator.

In the horizontal rows, the cathode, the grid and the plate respectively are in high-frequency short-circuit relation with the wall 1, while in the vertical rows, in a similar way, the cathode, the grid and the plate respectively are in conducting relation with the wall 1. The sizes of the current conducting loops 38 and 39 indicate the values of the potentials to be induced in the toroidal space by the high-frequency magnetic rotary field for each of these various circuit systems. Circuit systems, as shown in Figs. 7d, 7e and 7f in which the grid is in high-frequency short-circuit relation with the wall 1, are of advantage in that in these systems the two current conducting loops 38 and 39 and thus also the two induced potentials assume the lowest values. The circuit system of Fig. 7d has the additional advantage that the cathode is in conductive connection with the wall. In other words, for the heating of the cathode, the wall of the tank or vessel 1 and the current conducting loop 38 may operate as one of the connections. The other lead for the cathode heating current supply is positioned bifilar in the interior of the conductor of the current conducting loop 38 and is thus shielded against high frequency. The D.-C. potentials acting on the two electrodes that are not in conducting relation with the wall of the vessel, must be impressed across blocking capacitors 43 and 44.

Figs. 8 to 11 illustrate the structural arrangement of the most preferable system shown in Fig. 7d. The blocking capacitors 43 and 44 consist of metal plates to which are connected current conducting loop 39 and grid 41, respectively. The plates are isolated from the wall of the vacuum vessel by mica laminations 108. The latter form the dielectric of the blocking capacitors comprising the metal wall 1, on the one hand, and the metal plates 43, 44 on the other hand. The grid D.-C. potential and the plate D.-C. potential are impressed across the mica laminations by the use of bifilar leads, as explained in connection with Fig. 12. Cathode 40 must be heated to incandescence. For this purpose, a heater coil 109 is provided, one end of which is connected with the cathode. The other end of coil 109 is guided bifilar through an insulated heater lead 109′ (Fig. 8) within the metal loop 38 (having the action of a current loop) to the wall of the vessel 1 and then to the atmosphere.

The interior of the cavity resonator in the embodiment of Fig. 8 is located above the wall 1. It is here where the high-frequency magnetic field exists which is at right angles to the plane of the drawing. By virtue of the metallic conductors 38 and 39 acting as current loops, the said field induces high-frequency potentials across cathode 40 and grid 41, on the one hand, and plate 42 and grid 41, on the other hand. The three electrodes 40, 41 and 42 are covered by a metallic cap 45 connected vacuum-tight with the wall 1. By means of said cap, the triode 107 serving as a transmitter tube is confined, conjointly with the cavity resonator, inside a joint and common high-vacuum space.

The construction of current conducting loops 38 and 39 and their lead-ins across the wall 1 of the vacuous vessel require particular attention. Inasmuch as these conductors are frequently called upon to carry considerable currents, the conducting parts thereof consist of tenuous tapes or ribbons of appreciable width which are disposed inside the toroidal space in a position parallel to the flux lines of the high-frequency magnetic rotary flux. If for this position between current conducting loop and magnetic field the tape or ribbon conductors were simply passed through a slot formed in wall 1, an undesirable disturbance of the flow of the surface currents would occur on the inside of the toroidal space. Therefore, conductor ribbons of current loops 38 and 39 are subdivided into a plurality of rod-shaped conductors 46 at the place of passage through the wall 1. Each of the conductors is brought in through a separate opening 110 in the wall 1. The end of ribbon-shaped conductor of current conducting loop 38 which is connected with the wall has a row of openings at a point directly above the wall 1 and therefore at its base end. The surface current on the inside of wall 1 can pass from one side to the other of the ribbon-shaped conductor through these openings.

Due to this arrangement of the conductors, disturbances of the flow of surface currents in the toroidal space are minimized.

The exemplified embodiment shown in Figs. 1 and 2 uses for the cavity resonator a hollow space, topologically speaking of single coherence, which is equivalent to a sphere. For the generation of ultra-short electric waves, cavities have been used, which are topologically speaking of multiple or, more particularly, duplex coherence equivalent for instance to a tore. In regard to the acceleration of electrically charged particles, as will be hereinafter discussed, cavities of topologically single coherence are especially suited.

Figure 12:
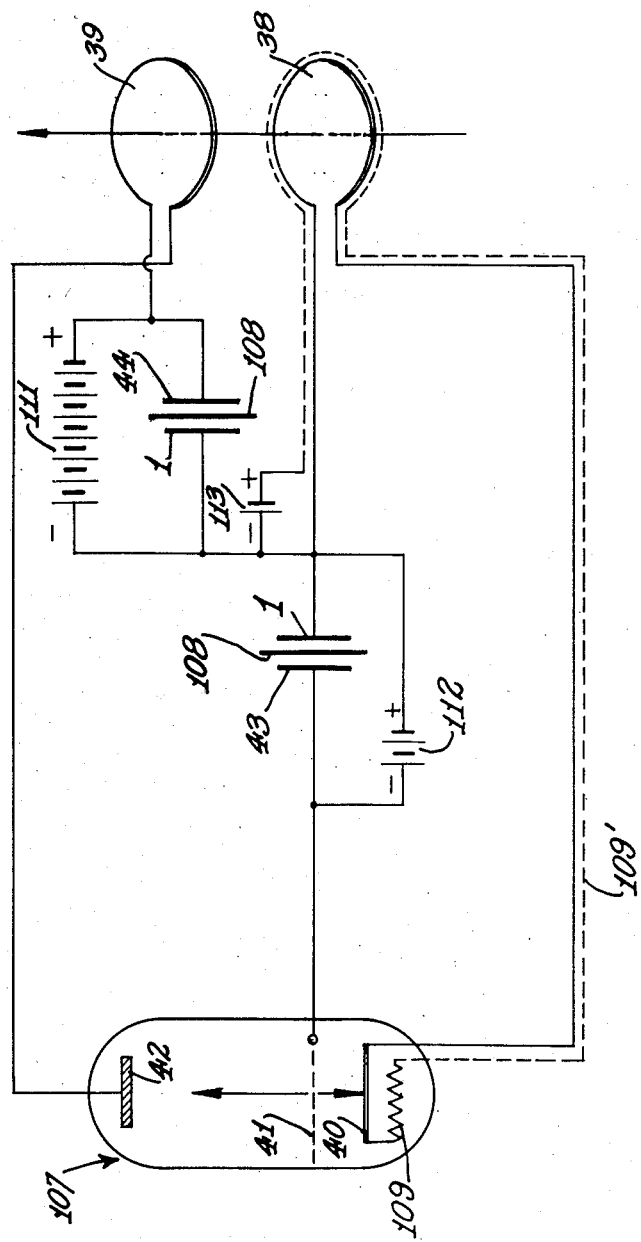
Fig. 12 is a circuit diagram designed for the operation of a tube as shown in Figs. 8 to 11.

Fig. 12 shows a circuit diagram including the triode 107 as illustrated in Figs. 8 to 11. As will appear from Fig. 12, plate 42 is connected with one terminal of the current conducting loop 39, the other terminal being connected with the positive pole of a plate battery 111. Grid 41 is connected with the negative pole of a grid battery 112. The heater coil 109 by way of insulated bifilar heater lead 109' is connected with the positive pole of a heater battery 113. Furthermore, cathode 40 is connected through current conductor loop 38 with the wall 1, and grid 41 is connected with plate 43. Wall 1 and plate 43 constitute one of the blocking capacitors. The other blocking capacitor is constituted by wall 1 and plate 44 and connected in parallel relation to the battery 111. The grid-plate and the grid-cathode radio-frequency potentials are indicated by arrows, and the magnetic field by a third arrow traversing the current conductor loops. The magnetic field cuts across the latter in such a manner that grid-plate potential and grid-cathode potential have opposite signs.

*One stage-accelerator with radio-frequency potential to accelerate electrically charged particles*

Fig. 13 shows a first simple embodiment and use of a cavity resonator designed for a single acceleration, of electrically charged particles. The cavity resonator of Fig. 13 is a body of revolution. It is substantially the same as the half of the cavity resonator, as shown in Figs. 1 and 2, located above the median or equatorial plane, the assumption being that a sheet bottom 1" has been inserted in the arrangement of Figs. 1 and 2, at the place of the median or equatorial plane.

Referring to Fig. 13, a source or emitter of electrons, generally designated by 47, emits a pencil 48 directly in downward sense. The electron pencil source is shown more in detail in Fig. 16. It shall be discussed further below by reference to this figure. The particles of this electron pencil or beam are accelerated in one half wave of the high-frequency or radio-frequency potential between capacitor half 3' and bottom 1", the said radio-frequency potential impeding the issuance of electrons from the emitter during the other half wave. The pencil of accelerated electrons strikes the target comprising an anti-cathode 49 mounted in a separate extension, produces on the anti-cathode a beam of X-rays 50 horizontally issuing through a window. The hardness of this intermittent X-ray pencil, of course, will vary with the velocity of the electrons striking the anti-cathode.

In Fig. 13 as well as in the corresponding later illustrations such auxiliary means as have previously been explained and are not essential for the understanding of the disclosure, for instance, tuning means, etc. have been omitted.

Instead of impinging upon an anti-cathode 49, the beam of electrons 48 could also be made to strike another object, or be made to issue through a window. Instead of using a source of electrons 47, a source emitting particles with positive electric charge, more particularly positive ions, say, protons, deuterons, or nuclei of helium atoms could also be used. The beam of particles of positive electric charge may be caused to bombard an object, such as a specimen of substance to be radiated by ways and means well known in the prior art.

Substituting for the appendage containing the anti-cathode 49 a bush or lead-in insulator, and for the electron pencil 48 a metallic conductor, then the high-frequency high potential existing across the head end of the bush insulator and the tank of the cavity resonator may be taken off in the open air.

According to Fig. 16, the ray source 47 comprises a cylindrical tube 115 in which is mounted a concave reflector surface in form of a spherical calotte 116 with an oxide coat 117 acting as the cathode. This cathode 116 is heated by means of a heater coil 118 connected to battery 119 so that it is caused to give off electrons. The latter, by means of a grid 120 disposed concentrically in reference to the oxide coat and impressed with voltage from a battery 121, are accelerated, thus resulting in focused pencil 48 issuing through an aperture into the cavity resonator. A pump is unnecessary for the embodiment according to Fig. 13 inasmuch as the vessel works with electrons rather than with gas ions. Hence, it is operable under sealed condition.

*One-stage accelerator operation with D.-C. potential for the acceleration of electrically charged particles*

Fig. 14 shows a cavity resonator of the type as shown in Figs. 1 and 2. In the median plane of this cavity resonator, that is, between the two capacitor halves 3', there is mounted a metallic disk 51 which is supported by a cylinder 52 of insulation material, preferably ceramic. Cylinder 52 of insulation is placed inside the toric space, in other words, outside the region of high-frequency electric fields. This is important to prevent the cylinder from being heated under the influence of high-frequency electric fields with the risk of disturbing losses.

The electron emitter 47 mounted in the upper half of the capacitor 3' issues its intermittent electron pencil 48 perpendicularly in downward direction onto plate 51 acting as anode. The said plate 51, which is an electrode enclosed by the cavity resonator, is charged in respect of the wall of the cavity resonator to a high D.-C. potential which coincides with the peak value of the radio-frequency potential across the capacitor half 3' and plate 51. The insulated support 52 of plate 51 serves to maintain said D.-C. potential. In order that no flashovers may occur towards the wall of the cavity resonator from the comparatively sharp edge of plate 51 as a result of the said D.-C. potential, the said edge is encased by a well rounded collar 53 having roughly a triangular cross-sectional shape and being fashioned out of sheet material. Positioned so as to face the said collar 53 is an insert 54 of annular form pressed out of sheet material and in conducting relation with the wall of the cavity resonator. Collar 53 and insert 54 form the electrodes of a capacitor which increases the capacitance of plate 51 in reference to wall 1 and cover 2 of the cavity resonator so that the pulsation factor or ripple of the half-wave rectifier represented by the arrangement due to the presence of the electron pencil 48 is reduced.

It will thus be seen that across the field space between 53 and 54 there exists only a high D.-C. potential smoothed by said additional capacitance. The said D.-C. potential may be brought out through a metallic conductor inside a lead-in insulator or which, for instance, could be used for the purpose of accelerating an electron pencil 56 emitted from a further electron-emitting source, generally designated by 55. Fig. 17 shows the electron emitter or source 55 more in detail. The accelerated electron pencil 56 may then be caused to issue through a window 57 for further use. As in Fig. 13, pencil 56 could be caused to impinge upon an anti-cathode for the generation of X-rays of constant hardness. The electron source 55 requires a separate source of energy for heating of its hot cathode and for electron-optic generation of such auxiliary potentials as are needed for the beam formation. In the present instance, this energy is derived most simply by a current-conductor loop 58 from the high-frequency magnetic field in the toroidal space. By means known in the prior art, it could also be supplied through an insulating revolving shaft of a dynamo accommodated in collar 53.

Electron source 55, as shown in Fig. 17 is similar to source of electrons 47 (Fig. 16), with this difference that it is supplied from a one-way or half wave rectifier means 125 rather than from a battery, said means being indicated in box form. Box 125 is connected by way of a blocking capacitor 126 with collar 53. Current conductor loop 58 is led-in by an insulator in the interior of collar 53 and is brought into the box 125 so as to be insulated therefrom. Current loop 58 being induced by the magnetic field supplies a radio-frequency potential to the rectifier means 125, while the rectifier means through three wires supplies to the electron source 55 the two potentials which in Fig. 16, are supplied to the electron emitter from the two batteries 119 and 121.

The apparatus as shown in Fig. 14 does not require a pump since it is also sealed.

Fig. 15 substantially is the same as Fig. 14 except that in embodiment of Fig. 15 the high D.-C. potential at capacitor 54, 54 resulting from half-wave rectification is utilized for the purpose of accelerating a pencil 60 consisting of particles with positive electric charge issuing from a source, generally designated 59. The latter shall be more fully described in conjunction with Figs. 18 and 19. The accelerated pencil of particles of positive electric charge and constant speed impinges upon a target 61. Ways and means may be provided to exchange the target 61 without the necessity of interrupting the D.-C. potential, or destroying the vacuum. This, may be accomplished by the use of vacuum gates or locks and a mechanical mechanism so designed that a target placed and confined within a cartridge may be moved out of the open to the point of bombardment of the positive particle pencil and be withdrawn therefrom again. Such locking or gating and withdrawal of the specimen or target to be submitted to bombardment is accomplishable wholly automatically and more or less continuously.

In another embodiment, source 47 of an electron beam serving for half-wave rectification could be built into plate 51 and direct the beam 48 towards one of the capacitor halves 3'. Plate 51 will thus assume the high positive D.-C. potential. If the source of a beam of particles with positive electric charge is accommodated in collar 53, then a beam of particles of positive electric charge from collar 53 to insert 54 may be caused to assume a constant rate of speed, said beam issuing from the cavity resonator in a way similar to electron beam 56 of Fig. 14.

If the beam represents a mixture of two kinds of particles distinguishing themselves from each other by different ratios of charge to mass, such dissimilar particles after passing through a constant potential can be sorted, for example, by a magnetic field or an electric field. Such a device is highly efficient for the sorting of isotopes inasmuch as it is capable of withstanding very high corpuscular streams, without any impairment of the homogeneousness of the beam.

The energy for the operation of the sources of the electron beam and the beam of particles of high positive charge can be raised also in this embodiment to the high positive D.-C. voltage of plate 51 by means of an insulated rotating shaft of a dynamo. The supply of gas to the source of the beam of particles having positive electric charge is conducted, preferably under high pressure, interiorly of a capillary tube made of insulation material such as glass or ceramic.

As will be noted, in apparatus of the type last described and as illustrated in Figs. 14 and 15 the rectification and the corpuscular beam accelerated by the ensuing high D.-C. potential proceed within one and the same vacuous space.

For the purpose of greater smoothness, that is, less ripple, full-wave rectification rather than half-wave rectification can be applied by using a second emitter 47 in the lower capacitor half 3', Fig. 14 or 15.

*Source of beam or particles having positive electric charge*

Fig. 18 illustrates a source of an electron beam which is adapted, regardless of purpose, to the generation of a beam or pencil of particles having positive electric charge. This source of electron rays may be used as source 59 of Fig. 15. To the right of wall 62 of a high-vacuum vessel, there is the vacuous space into which is to be directed through an aperture 63 a ray or beam 64 comprising particles of positive electric charge. Posteriorly of the said aperture 63 is a metallic chamber 65. The latter is subdivided into two chambers by means of a diaphragm 66 with an aperture 67. In one of said chambers is provided, properly insulated, an annular thermionic cathode 68 having a coat of oxide; in the other chamber, insulated in the same manner, is a plate 69, being preferably cup-shaped. The gas to supply positive particles, say, hydrogen gas, deuterium or helium is constantly being drawn, by the action of an oil diffusion pump 70, from the cathode chamber and is fed through a duct 130 and an opening 130' to the anode chamber. By the resulting pressure difference between the two chambers, a stream of neutral gas particles passes through the diaphragm aperture. Numeral 131 is the heated oil tank, 132 the heating resistor for the oil tank, 133 the source of current supply for the heater resistor, and 134 the connections for the cooling water.

When a D.-C. potential is impressed across anode and cathode, an arc discharge is set up resulting in a constrictive focusing cathode in the diaphragm opening 67. The said constrictive cathode may be conceived as being an electric double layer stretching across opening 67 similarly to a membrane of a soap solution. By the action of the said double layer, electrons will be accelerated in the direction towards the anode, and positive ions in the direction towards the cathode. When the total potential across this gas discharge with positive characteristic is raised, then the drop of potential across said double layer is increased with the result that the positive ions issuing from the double layer in the direction towards the cathode assume the character of a marked ray or beam. The beam passes along the axis of the annular cathode and finally through opening 63 into the vacuous space on the right hand-side of wall 62. In the process, as described, a high percentage of the neutral gas particles traveling out of the anode chamber onto the diaphragm opening 67 are ionized, and these ionized particles are rendered useful for the formation of beam 64 consisting of particles with positive electric charge. The bulk of such particles as fail to undergo this process are drawn off as previously mentioned, by pump 70 in the form of neutral particles and are again returned to the anode space 69. From a storage flask 135, for instance, by way of an adjustable needle valve and a conduit 71, the gas supply is replenished in accordance with the consumption of gas by beam 64.

Ring cathode 68 is supported by a perpendicular upwardly directed tube 136 as on a stem. The said tube has a flared upper end to form a collar 136'. The latter is fixedly held in the interior of a short metal tube 137 by the aid of two glass seals 138 and 139. Extended inside the tube in downward direction is a wire 140 for a heater coil 141 which is lodged interiorly of the cathode ring 68. The heater coil is connected by wire 140 with a battery 142. The connection between the ring 68 and its source of current supply, an impulse generator 73, is provided by a lead 143 which is connected with metal tube 137. Anode cup 69 is supported by a rod 143 which is attached to a cap 144, the latter, in turn, being supported by the wall of chamber 65 with interposition of a glass seal 145. Cap 144, that is, the anode as well as the cathode are connected to impulse generator 73.

When a beam of particles of positive electric charge is to be accelerated by a high-frequency potential, as is generally the case with multiple-stage accelerators hereinafter described, then it is desirable to provide a source furnishing an intermittent beam of particles of positive electric charge. The arrangement illustrated in Fig. 18 may be used for this purpose by impressing an intermittent D.-C. voltage across anode and cathode of a kind as shown for instance, in the time graph 72 in Fig. 18a. This diagram shows the regular radio-frequency sequence of a plurality of brief D.-C. impulses, the latter being supplied from impulse generator 73. The required energy is supplied to the said generator by way of an A.-C. lead 74. Numeral 75 designates the control leads into which is fed the radio-frequency potential derived, for instance, from the oscillations of the cavity resonator in accordance with the time graph 76 (Fig. 18b). By action of the impulse generator, each positive half wave in time graph 76 corresponds a D.-C. potential impulse in the time graph 72. Means must be provided whereby the time graphs 72 and 76 are dephased in relation to each other at the impulse generator 73.

Fig. 19 is similar to Fig. 18 with the difference that the impulse generator 73 is replaced by a battery 150 between cathode 68 and plate 69.

*Multi-stage accelerator with D-shaped segments or dees*

A critical examination of the construction of a cyclotron demonstrates that the great expenditure in ferro-magnetic material and copper for the coils of the magnet is due to the circumstance that the magnetic flux crosses twice the insulating space for the high-frequency potential between the ground and the two dees.

This difficulty is obviated by a construction, as shown in Figs. 20 to 25. It comprises a specially designed cavity resonator and two magnet systems.

Figure 20:
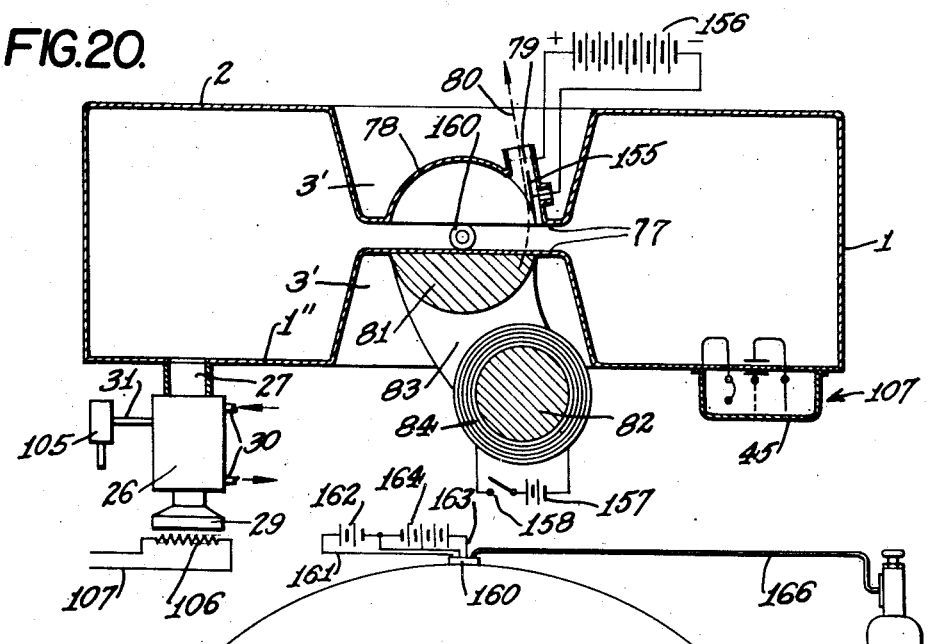
Fig. 20 is a sectional side view of a multiple accelerator according to the invention with D-electrodes or "dees" and including a cavity resonator and two magnet systems, one only being shown.
Figure 21:
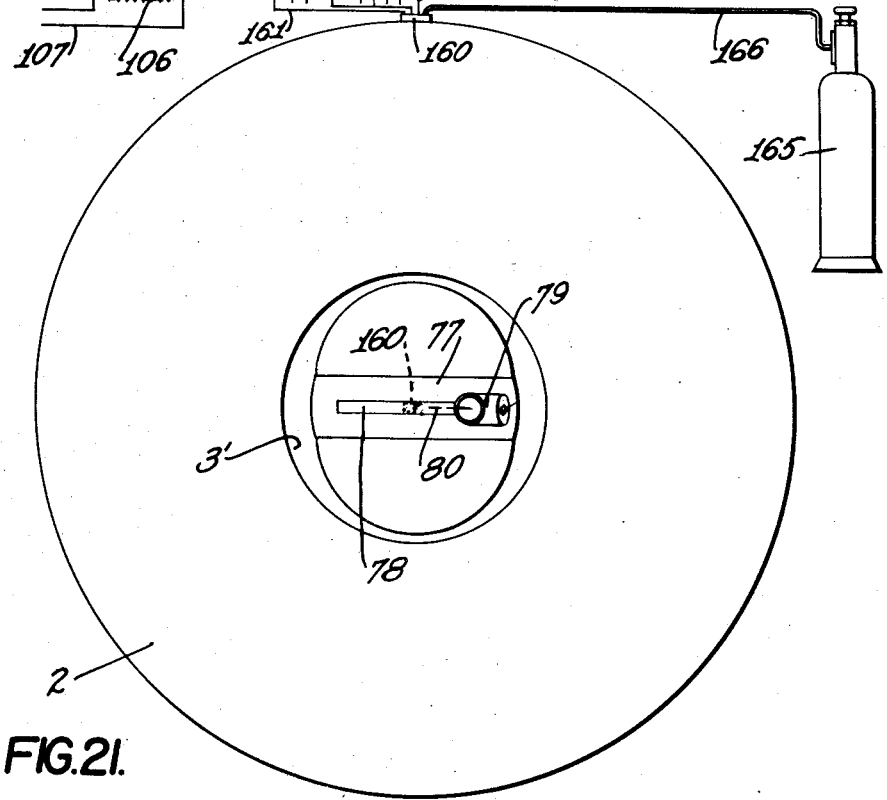
Fig. 21 is a plan view of Fig. 21, the magnet systems being omitted.
Figure 22:
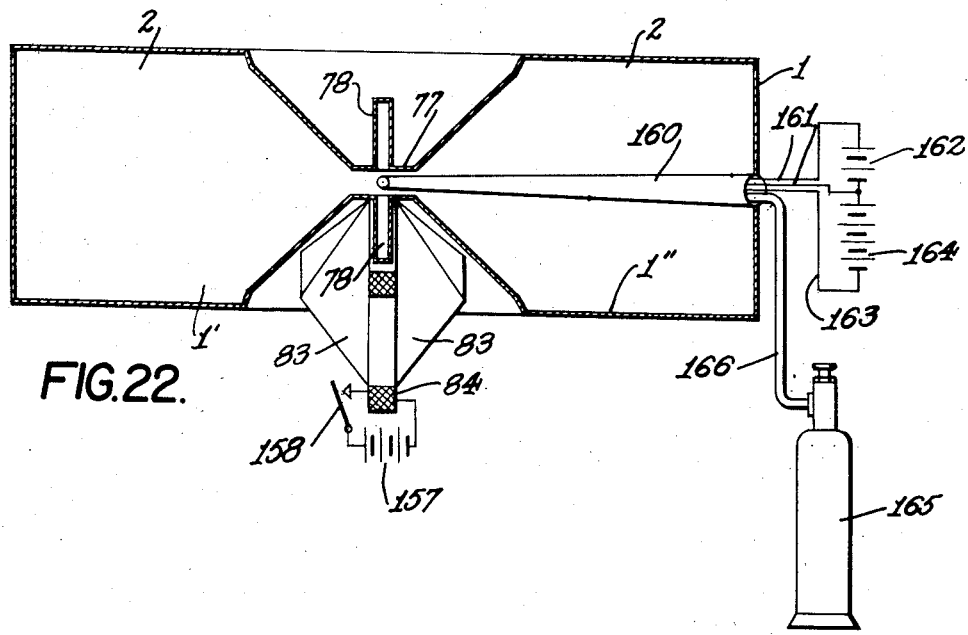
Fig. 22 is another sectional side view of Fig. 20, turned through an angle of 90 degrees, one of the magnet systems being omitted.
Figure 23:
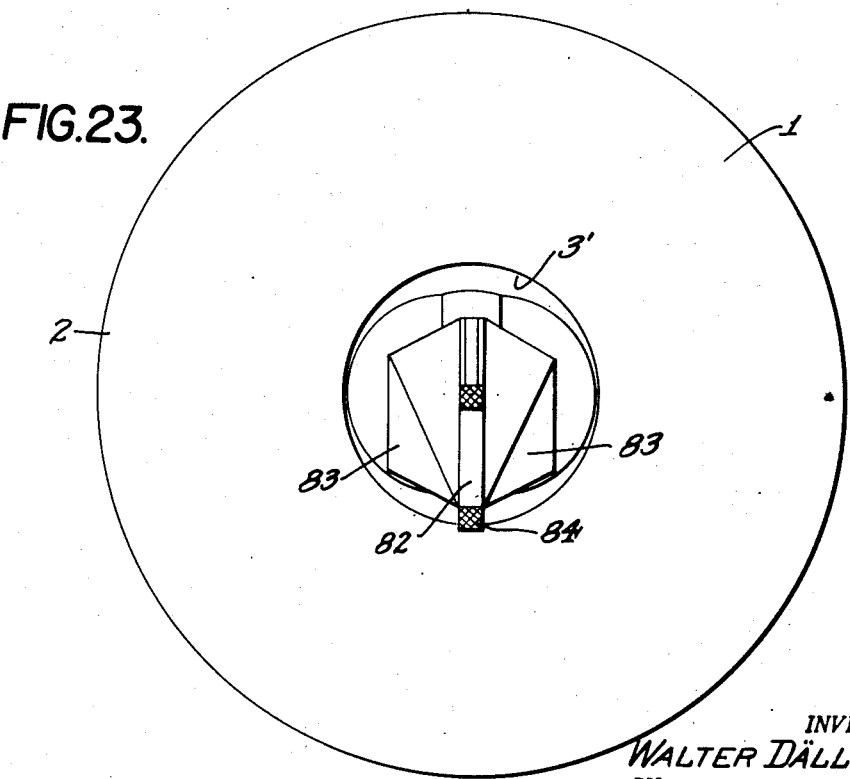
Fig. 23 is a plan view of Fig. 22.
Figure 24:
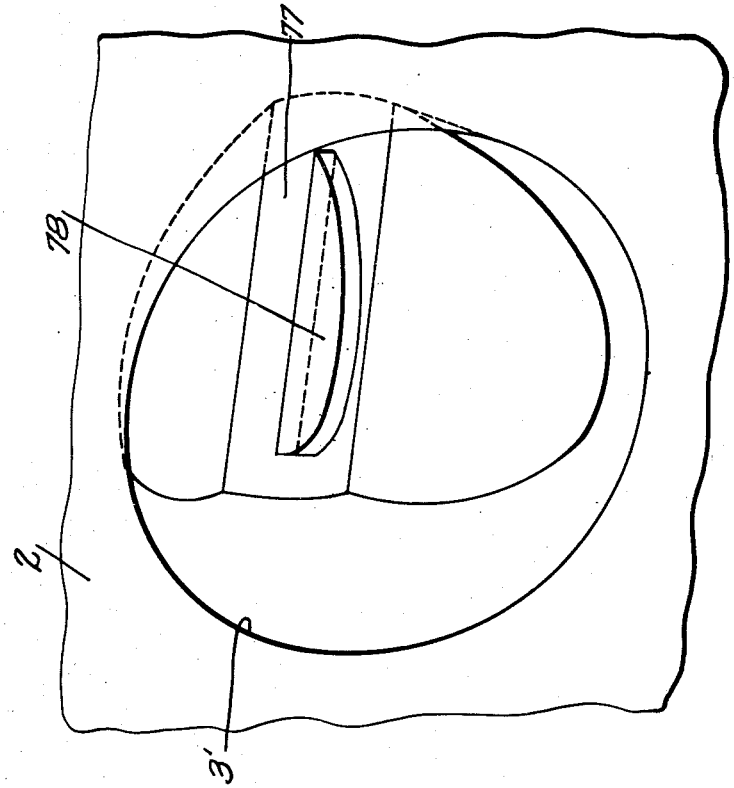
Fig. 24 shows axonometrically one capacitor electrode.

For an understanding of this construction, it will first be necessary to get a conception regarding the geometric shape of the two capacitor electrodes 3'. As shown in Fig. 20, they have the form of circular truncated cones. Fig. 22 shows that they are cut along planes at an angle of 45 degrees, with the result that the two plates of the capacitor facing each other are oblong rectangles 77 rather than circular surfaces as can be noticed from Figs. 21 and 22. Into these oblong rectangles, which, in comparison to circular surfaces have appreciably lower capacitance which means considerably lower joulean losses, two dees 78 are fitted as outwardly projecting pockets so as to insure vacuumtightness. This construction can best be seen on the axonometric representation of Fig. 24 which shows an elevation of the construction of a capacitor half viewed from the outside. Contrary to the embodiments hereinbefore considered, this construction is a departure from rotation symmetry, the purpose being to use only just as much capacitance as is required for the insertion of the two D-shaped segments or dees. The two capacitor halves otherwise connect in the customary way with the toroidal space comprising bottom 1'', cover 2 and the cylindrical wall of tank 1 forming the inductance.

It can be readily seen that, when the cavity resonator is excited to generate electromagnetic oscillations between the two dees, there will arise a high-frequency field in a similar way as in a cyclotron. However, conditions are more favorable in that the field will be better concentrated because of the effect at the openings of the two dees caused by capacitor plates 77. Another feature is that the novel oscillatory system requires less capacitance than a cyclotron, since the capacitance of the outside of the dees in respect to the pole faces of the magnet system is absent. Finally, the cross-sections for the currents in the inductance are far larger than in the case of the oscillation system of a cyclotron. All of these factors make it feasible to increase the potential between the dees appreciably, without a corresponding increase in the losses.

The source of particles having positive electric charge is mounted in the median plane between the two dees in the neighborhood of the axis in the same manner as with a cylcotron. This source is supported most conveniently in the zone of the current antinode, similarly to the support of disk 5 by arms 8 in Fig. 1. Interiorly of such support arm the gas supply as well as the supply of such energy as is required for the excitation of the source of positive electric particles may be accommodated. In a way similar to a cyclotron, the issuance of the beam is obtained by a deflecting plate 155. The latter, however, can here be mounted entirely separated from the high-frequency field and be impressed with D.-C. potential. As shown in Fig. 20, an outlet tube 79 for a beam 80 is disposed at one of the dees. Deflector plate 155 is mounted inside tube 79 and is energized by means of a battery 156 having one terminal connected to plate 155 and the other terminal to tube 79.

As the outside of the two dees is completely screened from high-frequency fields and is in contact with the open air, the magnetic field required for the guidance of the particles can be set up by the aid of magnet systems of similar design and mounted in symmetric relation to the central plane of the cavity resonator. These magnet systems, one for each dee, have to provide ampere-turns only for the thickness of the dees, whereas in a cyclotron, as previously mentioned, the magnetic flux is conducted also across the insulating distance or space required for the high-frequency field. Hence, it is possible to attain for the same exciting power and lower high-frequency power, an appreciable saving in ferro-magnetic material and winding copper in comparison to a cyclotron.

Each of the magnet systems comprises two pole shoes 81 which are of segmental cross-sectional shape to match the form of the dees, a core 82 of circular cross-section, and two prismatic yokes 83, the core and pole-shoes forming a closed magnetic path. Wound upon the core is an exciting coil 84. In order to show the latter more clearly, it is illustrated in section in Figs. 22, 23 and 25. The coil 84 is energized by a battery 157 connected to it by a switch 158. As it is important that the two magnet systems are symmetrical to each other, it is necessary to mount and support them upon a common and joint base plate or bed (not shown in drawing). Mounted upon the same bed is also the cavity resonator 1, 2. In order that for the issue of the beam 80, tube 79 may be easily accessible, core 82 of the magnet system is eccentrically arranged, as shown most clearly in Fig. 20.

As in a cyclotron, the magnet field is not constant throughout the whole pole face, but decreases for the purpose of axial focusing of the beam, inside the dees from the center towards the margin. Additional focusing is effected by the peripheral variation of the magnetic field, this being due to the fact that, unlike a cyclotron, there are two symmetrically disposed magnet systems rather than one.

For the ion source, any suitable source may be employed such as conventionally used in connection with cyclotrons. In Figs. 20, 21 and 22 the ion source is diagrammatically shown as a small lateral opening at the end of a slightly conical or tapered tube 160. Tube 160, starts at the circumference of the cavity resonator tank 1 to which it is fastened in the equatorial plane with floating support and is extended as far as the middle between two dees 78. Inside the tube there are the current-supply leads 161 which connect a thermionic cathode (not shown) with a heater battery 162, and leads 163 connected to a battery 164 designed to produce the potential between an anode (not shown) and the cathode which furnishes the ions in an arrangement basically the same as in Fig. 18. Tube 160 further serves to conduct the supply of the gas, the latter being supplied from a storage flask 165 through a conduit 166.

*Accelerator comprising discrete guide-channels for heavy particles*

An important further development of the previously described constructions resembling a cyclotron is illustrated in Figs. 26 to 38a. In these embodiments discrete guide-channels are employed in lieu of the dees for the guidance of the particle orbits. Each of the guide-channels is encompassed by electromagnetic means for producing individual magnetic fields spacially inhomogenous in direction and strength and invariable as to each moment of time, each of said fields traversing the respective guide channel for guiding and focusing particles traveling through said channel. The design of the guide channels and of the electromagnetic means encompassing the same will be more fully explained in connection with Figs. 34 to 36a.

In the case of the cavity resonator as shown in Figs. 26, 26a and 27, the two capacitor halves 3' are fitted with capacitor plates 85 of annular shape, again for the purpose of minimizing capacitance. Into the interior of the annular plates forming parts of the wall of the vacuum tank, there are hermetically fitted the spherical cups or calottes 86. This arrangement can be seen most clearly from Fig. 26a. Fig. 26 illustrates the capacitor halves 3' in section through a cylinder over subcircle 87 rather than through the axis.

Seated on the subcircle at the upper capacitor half, is a conventional source 88 of a beam of particles with positive electric charge so that said source is readily accessible from the outside. Beam source 88 resembles the emitter as shown in Fig. 18. By means of three current-supply leads 170, that is, for the plate, the cathode and the heater of the cathode of the source, source 88 is connected with an impulse generator 171 which is controlled by a current conductor loop 172 extended into the cavity resonator by means of insulators 172'. The conductor loop is shown as a simple metallic loop which is immersed in the radio-frequency magnetic field of the cavity resonator. The impulse generator is fed by a battery 173. The beam generated by the said source 88 passes perpendicularly in downward direction, and it is accelerated in the corresponding half wave of the radio-frequency electric field between the two halves of the capacitor.

A single particle, the so called "optimal particle" shall now be examined. This particle traverses the median plane of the cavity resonator in each case just at the instant when the radio-frequency potential, that is, the accelerating half wave reaches its peak value "U." After passing through the acceleration section, the optimal particle under consideration enters the first guide channel 89, a tube 91 (see Fig. 36) positioned in or covering a semi-circle in a plane parallel to the axis of the cavity resonator. This guide-channel is in a magnetic field at right angles to its plane. The direction of the magnetic field is indicated in Figs. 27, 34, and 36 by arrows MF. The particle having speed "U" passes through the same, re-enters the acceleration section and passes, one half period of the radio-frequency potential later, again through the median plane. At the end of the acceleration section it enters a second guide-channel 90 at speed "2U." At the end of said second guide-channel, the optimal particle enters the acceleration section for the third time, and passes the median plane again one half wave of the radio-frequency potential later. This cycle is repeated until, after leaving the last guide-channel 91, the particle in question traverses the acceleration section for the last time and leaves as part of the beam through a readily accessible window 93 which is vacuumtight but pervious for corpuscular particles such as a metal foil known for this purpose.

Neglecting the transit times through the acceleration gaps—and this is generally admissible with satisfactory approximation except for the first crossing—and assuming that for all guide-channels a magnet system of like intensity is employed, then the radii of consecutive guide-channels are as $\sqrt{1}:\sqrt{2}:\sqrt{3}:\ldots$. These ratios of the radii of the guide-channels are realized in the assembly arrangement of Figs. 26, 26a and 27 and also in the diagrammatic view of Fig. 28 where the traversals of the particle orbit through the acceleration gaps are numbered 1–10.

Figure 29:
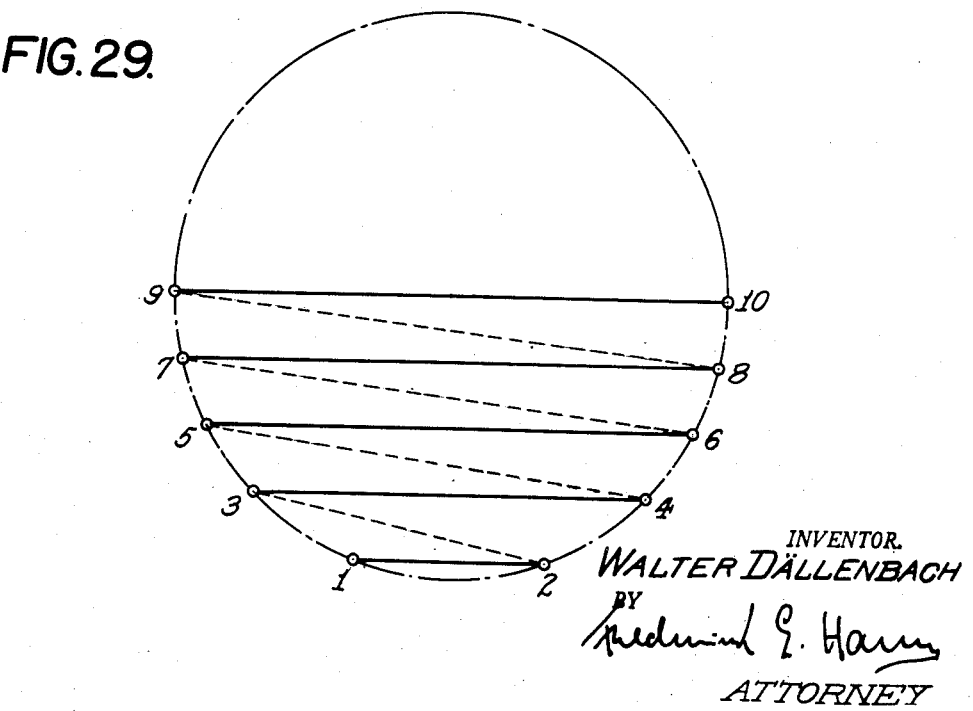

A relatively large number of guide-channels, and hence a large number of consecutive accelerations is feasible if radius ratio $\sqrt{1}:\sqrt{2}:\sqrt{3}:\ldots$ is abandoned, and if instead, as shown in Fig. 29, a guide-channel system is used in which, for instance, the odd-numbered channels are positioned parallel to one another, and if they follow one another spaced equal distances apart. The resonance condition, namely, that two consecutive crossings of the particle under consideration through the median plane of the cavity resonator have a time interval equal to a half-period of the radio-frequency potential of the cavity resonator, is in that case no longer accurately present, but only approximately so. As a result, the particle in question will leave the apparatus after $n$ many accelerations not at speed "$nU$," but rather at a lower rate.

A mathematical analysis made under the simplifying assumption that for the optimal particle, namely, the particle issuing at the highest possible final velocity upon each traversal or crossing of an acceleration gap, the accelerating potential differs from the peak value "U" of the radio-frequency potential only by a small amount, shows that, even when taking into consideration the transit times over the acceleration gaps, the time intervals between consecutive crossings through the median plane of the accelerating gaps and the transit times in the guide-channels along the orbit diminish uniformly. The result is that the optimal particle initially, that is, at the beginning of the orbit, is accelerated at instants which precede the peak values of the applied radio-frequency, that it then lags in reference thereto in a central portion of the orbit, and that finally it leads once more in the final portion of the orbit.

Particles differing as to the starting phase from the optimal particle will lag relative to the optimal particle in their final speed. Hence, if a powerful and homogeneous beam is to be obtained, it is desirable to use a source for particles with positive electrical charge which is controlled by the oscillations of the cavity resonator and which supplies small impulses of particles. The starting phase of these impulses is preferably adjusted to be similar to the starting phase of the optimal particle. Inasmuch as each impulse has a definite width, it is advantageous to cause it to occur in direct and immediate time sequence with the phase of the optimal particle. Such particles of the impulse which start after or later than the optimal particle will be less accelerated. Hence, in the guide-channels they travel along orbits with radii smaller than that of the orbit of the optimal particle, and are faster because of the radial space gradient of the magnetic field required for focusing. In other words, they have a tendency to catch up with the optimal particle. Consequently, they attain more energy than such particles which start prior to the optimal particles, they become increasingly more remote from it, and fall more behind in energy. These considerations as to the suitable phase of a particle impulse of definite width will be found correct also in a case where the magnetic induction in all guide-channels is made the same, and if the orbit radii of the optimal particle have a ratio of $\sqrt{1}:\sqrt{2}:\sqrt{3}:\ldots$.

Because of decrease of transit time along the orbit in the guide-channels, it is necessary that the magnetic induction from one guide-channel to the next should increase uniformly along the orbit, so that for the last guide-channel it attains the high value. In the case of guide-channels with rates of speed so high that the relativistic increase in mass becomes apparent, the magnetic induction must be fixed correspondingly higher. Consequently, in a multiple accelerator according to the invention comprising discrete guide-channels, the relativistic increase in mass may be taken into consideration exactly, and the undesirable effect thereof upon the conditions of resonance may be compensated which is not possible with a cyclotron.

Figure 28:
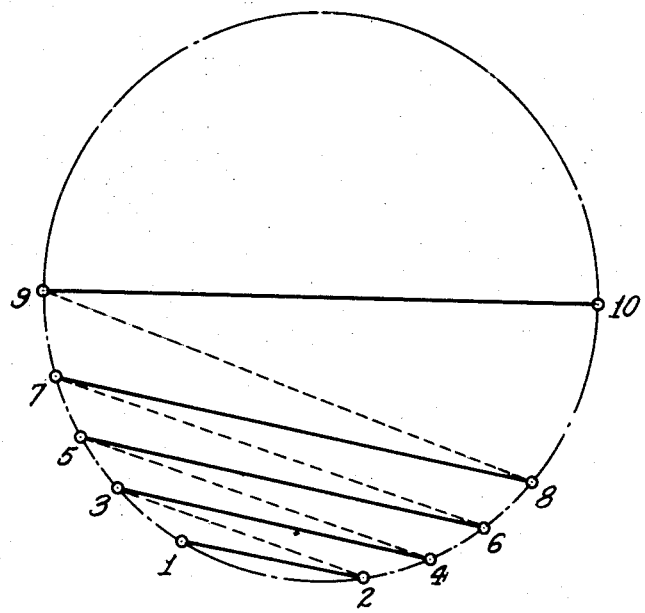
Figure 30:
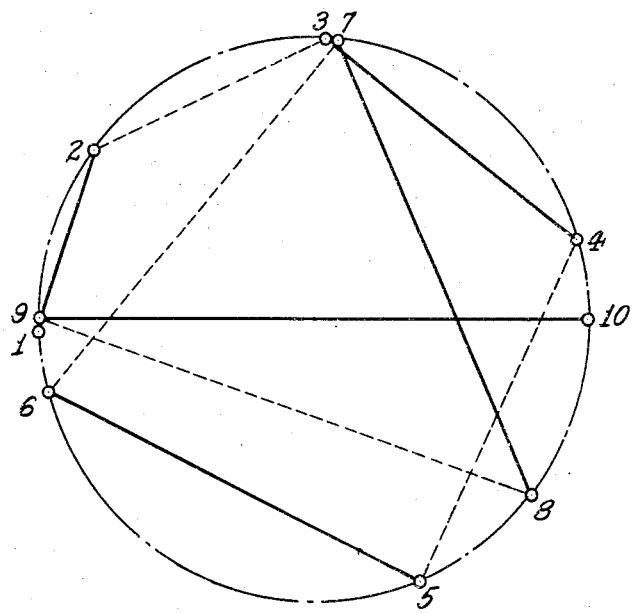

Comparing the guide-channel system with the rotor winding of a dynamo, then the guide-channel systems of Figs. 28 and 29 may be conceived to be coil windings. The analogy of a wave winding is illustrated in Fig. 30. In this instance, for radius ratios $\sqrt{1}:\sqrt{2}:\sqrt{3}:\ldots$ the crossing 3 and 7 as well as 1 and 9 through the acceleration gap coincide so closely in space that it is not possible, from the construction point of view, to accommodate the guide-channels. By suitably departing from the radius ratio, as just indicated, and by relaxing the rule of strict observance of the resonance condition, the said disadvantage may be avoided.

Figure 31:
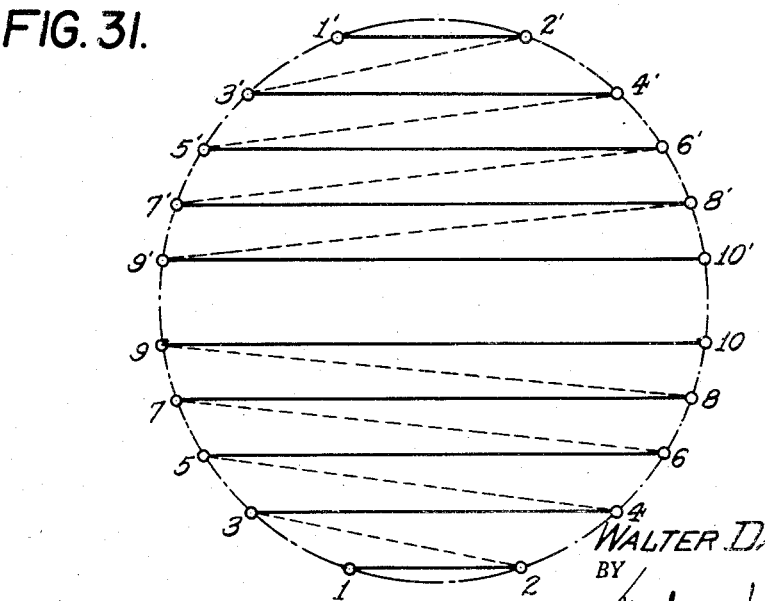

Fig. 31 shows in what way two guide-channel systems of the type illustrated in Fig. 29 may be accommodated in reverse symmetry for the purpose of better utilization of the cavity resonator.

Figure 32:
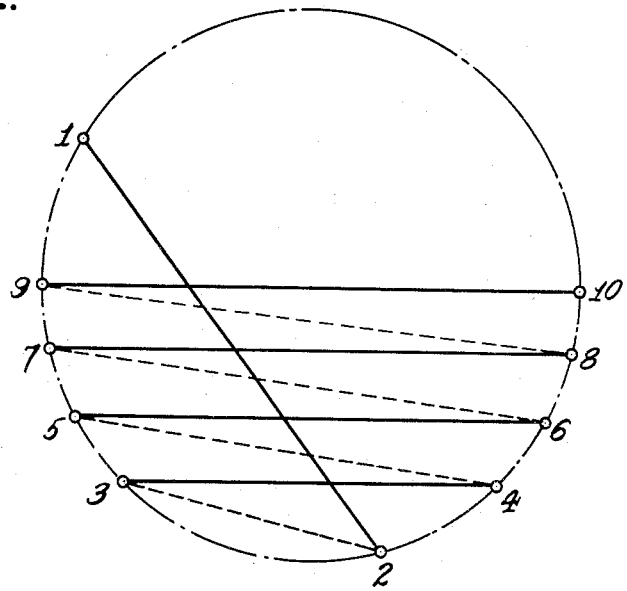

The transit time of the first crossing through the acceleration gap is comparatively high. The consequence is that, for certain radius ratios only a very brief transit time is available for the guide-channel next following. Hence, for this guide-channel it would be necessary to employ a magnetic field of relatively high intensity. This requirement can be obviated by making the first guide-channel, as shown in Fig. 32, so much greater that the second traversal of the acceleration orbit occurs not after one-half period, but roughly only after three half-periods of the high-frequency potential.

The geometric dimensions of the cavity resonator may be reduced so as to increase the frequency. However, certain limitations are imposed thereupon in that the magnetic induction in the guide-channel between two consecutive accelerations will have to be increased, as the transit time between these two consecutive accelerations is diminished. Still, a substantial reduction in the geometric dimensions of the cavity resonator is possible by choosing the time between two consecutive accelerations of electrically charged particles roughly equal to three times the half-period of the electromagnetic oscillations of the cavity resonator. The inductance of the cavity resonator is thus reduced to about one-ninth while the capacitance remains unchanged, and the linear dimensions of the toroidal cavity representing the inductance are cut down to around one-third. On the other hand, the high-frequency losses due to skin effect rise approximately $\sqrt{3}$-fold. The efficiency and utility of the apparatus are not impaired by providing transit times between consecutive accelerations equal to three times a half-period, as, just as before, optimal particles follow one another at time intervals equal to the period of the electrical oscillations, so that, in every guide-channel there are traveling alternately one or two optimal particles. Instead of choosing three times a half-period between two consecutive accelerations, it would also be feasible to choose a quintuple or, broadly, any other odd multiple value. The higher this multiple, the smaller will be the dimensions, but the higher the high-frequency losses of the cavity resonator.

The use of discrete guide-channels in lieu of dee's or D-segments has the advantage, first, that a further appreciable saving in ferromagnetic material and coil copper is feasible, and secondly, that the conditions of focusing by the magnetic field are greatly improved. As a result, the decrease in magnetic induction B with increase of radius $r$, that is the spacial gradient of B, can be made greater inside of each of the guide channels. If $$\sigma = \frac{dB}{dr} \bigg/ \frac{B}{r}$$

is a coefficient expressing the decrease of magnetic induction B with increase of radius $r$, it can be shown that angular frequencies $\omega_r$ and $\omega_z$ are characteristic for stability of the particle and given by:

$$\omega_r = \omega\sqrt{1-\sigma} \text{ and } \omega_z = \omega\sqrt{\sigma}$$

where $\omega$ is the angular frequency of revolution of the particle under consideration; $\omega_r$ the angular frequency at which a particle deflected radially oscillates about the undisturbed orbit, and $\omega_z$ the angular frequency with which a particle deflected in axial direction oscillates about the undisturbed orbit.

It will be noted that for $\sigma = \frac{1}{2}$ there is $$\omega_r = \omega_z = \omega/\sqrt{2}$$

Hence, the focusing effect in axial and radial direction, and consequently in any other direction, is exactly equal, and very much greater than the focusing effect in axial direction which is possible in a cyclotron for reason of the resonance condition to be maintained.

An improved focusing has still other advantages. First, the cross-sections of the guide-channels may be made small, a factor which has a favorable effect upon the material and energy consumption of the magnetic fields. This factor favorably affects also the number of guide-channels that may be accommodated. Secondly, current values can be increased until the current reaches a point where space-charge counter acting focusing begins to play a disturbing part. In other words, the apparatus is capable of carrying heavy loads, a circumstance which is of utmost importance also in reference to using a source for particles with positive electric charge and intermittent beam as described by reference to Figs. 18 and 19. In such system, the source is controlled by the oscillations of the cavity resonator. At intervals equal to one period of these oscillations, the source emits powerful particle impulses with a starting phase which, as already pointed out, is chosen equal to the starting phase of the optimal particles to attain particles with the highest possible final speed, so that the particle impulse of finite width follows directly the starting phase of the optimal particle.

To preclude disturbances and distortions of the magnetic fields guiding the particles, the guide-channels comprising tubes of circular or rectangular or trapezoidal cross-sectional shape are made of non-magnetic material as are the capacitor halves with which they are vacuumtight united, for instance by welding or soldering.

Fig. 33 shows how a tube of circular cross-section forming the guide-channel 95 containing the undisturbed particle orbit 94 is disposed between magnetic pole-shoes 96. The latter extend along the full length of the guide-chanel; for a field with spatial homogeneousness, they would be parallel to the plane of the guide-channel.

In Fig. 33 the pole-shoes flare somewhat with increasing radius so that a magnetic field gradient suited for better focusing may be attained. In other words, the pole-shoes are no longer planar, but present a conical curvature. For $\sigma = \frac{1}{2}$, as can be demonstrated by calculation, the generatrices of the opposite pole faces meet at a distance equal to the diameter of the particle orbit. Hence if the two generatrices of opposite pole-faces are extended, they will intersect at a point located at the other end of the orbit diameter. The generatrices located in the plane of the drawing of opposite pole faces could also be curved by following a curve such that the magnetic field decreases with growing radius according to $r^-$ or more particularly according to $r^{-1/3}$.

Figs. 34 to 36 show the construction of the magnet system of an individual guide-channel. The guide channel, for instance, guide-channel 91 in Figs. 26 and 27 is semi-circular and comprises a tube 91 of roughly rectangular or more exactly trapezoidal cross-section. The guide-channel is enveloped by two symmetric shells 98, 98' of magnetic material in which is accommodated an exciting coil split into two halves comprising coil sections 99 and 100 and the coil heads 101. Tube 91' of guide channel 91 and the electromagnetic means encompasing the same, to wit, coils 99 and 100 and magnet shells 98 and 98' are indicated in Fig. 26 by adding the respective numerals since the scale of Fig. 26 is too small to allow a more detailed showing without confusing the drawing. The left side of Fig. 34 is a meridional section of guide-channel 91 with the corresponding magnet system, the right-hand side is a view of one end of the magnet system with coil heads 101, both in elevation. Referring to Fig. 35, on the left-hand side the upper shell of the magnet system has been broken away, and a top view of the bottom shell 98' is shown. Fig.

36 finally shows an axonometric representation of one end of a magnet system lifted clear of the guide-channel 91 so that the coil heads 101 become clearly visible.

The coil sections 99 and 100 snugly fit the tube 91' of guide-channel 91. The coil heads 101 are divided into two sections, and between which the end of the guide-channel emerges. The coil heads are so constructed and embedded in recesses of the magnetic material that the dimension of the magnet system at right angles to the plane of the guide-channel is not larger at the ends than in the other cross-sections of the guide-channel. This permits to place a large number of guide-channels including their magnet systems side by side, unimpeded by the coil heads. If the various coil sections 99, 100 have each a square copper cross-section, and the iron cross-section for the magnetic flux is made alike throughout, then the cross-section of the entire magnet system at right angles to the guide-channel forms two squares.

Each of the exciting coil sections may comprise two parts. One part thereof, the main coil portion, includes the bulk of the ampere-turns. The other or minor portion serves for the fine adjustment of the magnetic fields. In lieu of the larger or major coil portion, there could also be used a permanent magnet which permits a considerable saving in exciting energy.

The width of the pole faces is governed by the width of the guide-channels. If the particle impulses are very narrow, narrow guide-channels will be satisfactory. Broader impulses necessitate broader guide-channels, especially at the beginning and, where the number of the guide-channels is large, also at the end of the channels. In order to save weight of iron or other magnetic material, it will be advantageous to vary the width of the guide-channels along the orbit; that is to make them broader, particularly at the beginning and, where a great number of channels are used, also at the end, than in the middle of the orbit which distinguishes itself by phase focusing or bunching of the impulse with finite width.

In an arrangement as shown in Figs. 26, 26a and 27, the guide-channels are semi-circles. However, conceivable also are guide-channels for curves as particle orbits in which the magnetic field in each point of the orbit is at right angles to the oscillation plane of this point, and has an intensity corresponding to the radius of curvature at such point of its orbit.

Each of the guide-channels as shown in Fig. 26 and Fig. 27 is enclosed in a pair of magnet systems described in connection with Figs. 34 to 36. The two sections 99, 100 of each exciting coil of the illustrated six magnet systems are connected in series through an adjustable resistor 175 to a battery 176, as shown in Fig. 36a.

Inasmuch as inside the guide-channels the magnetic field guides the particles along a predetermined orbit, it will be necessary that the magnet systems of the guide-channels are in a definite position in relation to one another as well as to the capacitor halves determining the accelerating electric field. Figs. 37, 38 and 38a show a construction adapted thereto.

The outer sides of the annular capacitor plates 85 of capacitor halves 3', which are turned to the outside air, present seating surfaces of rectangular shape being exactly fashioned in relation to the anterior surface. It is upon these that magnet systems 102 are seated with their end surfaces 103, and they are screwed fast by the aid of angle pieces or brackets 104 made of non-magnetic material. In order that demounting and mounting of the magnet systems 102 is possible without tedious adjustment and fitting work, it is advisable to secure the position thereof in relation to the capacitor plates 85 by pilot pins 177 so that they may always be restored to the same position.

By a construction as shown in Figs. 3 and 4, the two capacitor halves may be made accurately adjustable to each other.

It is essential for the operation of the apparatus that frequency and amplitude of the radio-frequency field across the capacitor halves of the cavity resonator as well as the intensities of the magnetic field in the guide-channels should be exactly constant. For the adjustment of these three quantities, quick-acting precision regulators may be provided so designed as to maintain any departures from a nominal or rated value below a limit value that is just permissible.

The apparatus is designed preferably for deuterons and helium atom nuclei for which the difference in the ratio of charge to mass is only about one percent. If it is desired to change to a kind of particles for which the ratio of charge to mass is different, say, protons, this will be possible by changing the amplitude of the radio-frequency field between the halves of the capacitor of the cavity resonator and the intensities of the magnetic fields in all of the guide-channels inversely proportional to the change of ratio of charge:mass, while the frequency remains unvaried. With a change from the use of deuterons to protons, the ratio of charge:mass rises to roughly twice the value. If accordingly the amplitude "U" of the high-frequency field and the intensities of the magnetic induction "B" in all guide-channels are reduced by one-half, the speeds of the particles and thus the radii and frequency remain unaltered. In other words, by a simple change in operating data, the apparatus can be adapted to work with protons rather than deuterons.

When the height of the guide-channels is fixed in axial direction at roughly 1 (cm.)—and this is feasible in the light of cyclotron experience—then by close packing of the guide-channels and for peak values of the radio-frequency potential across the two capacitor halves ranging between one and two million volts and higher, and speeds of the particles ranging between one hundred and three hundred million volts are obtainable.

A particle accelerator according to the invention comprising discrete guide-channels, as compared with a cyclotron as hitherto known, has the following advantages:

1. Saving of materials in that, for the same exciting energy and the same radio-frequency energy, the weight of the magnetic material amounts to only two percent, and that of the copper for coils to roughly ten percent.
2. The source or emitter of the particles is readily accessible.
3. Straight beam exit without deflector field.
4. Straight beam without deflection.
5. Higher load carrying capacity.
6. Absence of high magnetic forces.
7. Convenient correction of relativistic increase of mass.

8. No separate transmitter.
9. Maximum frequency stability.

*Accelerator with multiple guide-channels*

In apparatus designed for extremely high corpuscular or particle energies, particularly in those adapted for the acceleration of electrons to extremely high speeds, it becomes necessary to provide a very large number of guide-channels. This, however, as shall be shown further below, involves an unnecessary rise in cost.

In an important development and improved form of the previously disclosed accelerator comprising discrete guide-channels, the orbit of electrically charged particles from the emitter source to the target or window traverses, by means of "$p$" guide-channels, the radio-frequency high-potential electric field in a potential antinode of the cavity resonator through $(n-1)$ acceleration gaps for a total number of $(n-1)$ times, where "$p$" is smaller than "$n$"; so that at least one guide-channel is traversed by the orbit and travel of the electrically charged particles more than one time and, hence, constitutes a multiple guide-channel.

The construction of such a multiple guide-channel is especially simple for a plane orbit, in other words, if a plurality of complete revolutions or spires of the orbit of electrically charged particles are positioned in one and the same plane. The magnetic field of such multiple guide-channel will then be at right angles to the plane of this orbit.

In multiple acceleration of electrically charged particles, the orbit of particles repeatedly crosses the field space set up between the two halves of the capacitor in the potential antinode of the cavity resonator. From among a great variety of practical embodiments, two may here be cited that are particularly simple and in which:

(1) The field space between the two halves of the capacitor is spatially crossed alternately in the positive and the negative sense.

(2) The field space between the two halves of the capacitor is crossed spatially always in the same sense.

In the first embodiment which so far is the only one that has been considered, the time between two consecutive accelerations of electrically charged particles must be approximately equal to an odd multiple of the half-period, more particularly about equal to the half-period. In the second case, however, the said period of time must be about equal to a whole multiple of the period, more particularly about equal to the period. Maximum ultilization of the radio-frequency potential would result if the electrically charged particles traverse the acceleration gap exactly with the peak value of the alternating potential, a condition that has been assumed for the so-called optimal particle. In other words, the time between two consecutive accelerations should then be not "about equal," but rather "exactly equal," to an odd or an even multiple of the half-period.

In practice, this exacting condition cannot be fulfilled for various reasons. In the first place, the transit times over the acceleration gaps are finite; and for the first stages of the acceleration, the transit times are not negligibly small. Also, conditions of a constructional nature such as discussed in connection with Figs. 26–38, may make a departure from the exact condition appear to be advantageous. Other such steps of constructional nature shall hereinafter be disclosed.

Referring now to Figs. 39 and 40, the two acceleration gaps are designated 201 and 202 per revolution or spire. These acceleration gaps are the field space of the high-frequency electric field between the two capacitor halves in the potential antinode of a cavity resonator which therefore, for each revolution of the particles, is traversed twice, once, spatially speaking, in the positive sense and once in the negative sense. Reference character 203 designates the planar orbit of the particles which resembles a spiral and consists of semi-circles. This orbit lies within two multiple guide-channels 204 and 205 which cover semi-circles and to which the capacitors halves 3' are connected vacuum-tight. The two multiple guide-channels conjointly comprise what shall hereinafter be termed a "complete circular system." At the point designated by 206 the particles enter into this complete circular system which they leave at 207. In order that the inlet and outlet points are accessible, the energizing magnet systems are of special construction and arrangement. The exciting coils thereof indicated at 208 and 209, are disposed wholly at the inner and at the outer circumference respectively of the guide-channels 204 and 205. The magnet systems comprise magnetic cores 210 and 211 which are made of iron or other magnetic material and have U-shaped cross-sections. The cores extend over the guide-channels 204 and 205 from the inside and the outside, respectively. As a result, the inner circumference of guide-channel 205 and outer circumference of guide-channel 204 are left free for the entrance 206 and the exit 207, respectively, of the particles. In the case of orbit 203 which resembles a spiral, the time of rotation grows with increase of the radius. If a maximum of acceleration is to be imparted to the particles, the average time within the complete circular system between the time elapsing between two consecutive accelerations of the electrically charged particles must be roughly equal to an odd multiple of the half-period, that is, more particularly equal approximately to the half-period of the electromagnetic oscillations of the cavity resonator. Preferably, the particles are caused to enter into the complete circular system at 206 while having a phase lag in relation to the optimal particle. What is here referred to by "optimal particle" is the non-realizable, ideal instance of a particle being invariably accelerated by the peak value of the alternating potential. At the beginning of a spiral-like orbit 203, the time interval between two consecutive accelerations is substantially below an odd multiple of the half-period, more particularly substantially below the half-period of the electromagnetic oscillations of the cavity resonator. It increases in a uniform manner to values substantially above an odd multiple of the half-period, more particularly substantially above the half-period of the electromagnetic oscillations of the cavity resonator. Hence the initial phase lag of the particles changes to a phase lead, though towards the end of the spiral-like orbit or path 203 within the complete circular system, the particles revert to a phase lag. In other words, the phase of the particles fluctuates within the complete circle system with a single to-and-fro motion about the phase of the optimal particle. Coincidence of the acceleration of the optimal particle with the peak value of the alternating potential, occurs just twice. Axial focusing of the particles inside the guide-channels is obtained due to the fact that the magnetic induction decreases with increase of radius, as explained in more detail in connection with Figs. 26–38. In a case of optimal focusing, the magnetic induction will be made to decline with increase of radius so that the coefficient $\sigma$, as previously defined, assumes a value $=\frac{1}{2}$.

The decline of magnetic induction with increase of radius is accomplished, as shown in Fig. 40, by increasing the air-gap between the two pole faces of the magnet system with increase of radius. Occasionally it will be found sufficient to provide conical pole faces. The meridian section of the pole faces are then straight lines. If the guide-channels have substantial radii as may be the case, especially for multiple guide-channels—and if it is desirable that the magnetic induction should diminish linearly with increase of radius, then, as shown in Figs. 43 and 44, the meridional section of the pole faces of the magnetic cores 210 (211) must be equilateral hyperbolas. One asymptote of this equilateral hyperbola lies in the plane of the orbit, the other one is at right angles thereto at a radial distance "$r$" which is $(1=1/\sigma)$ greater than the radius $r_0$ of the particle orbit in case of a single guide-channel, or greater than the radius $r_0$ of the mean particle in case of a multiple guide-channel. In case of optimal focusing, the factor defining the position of the second asymptote assumes value $(1=1/\sigma)=3$.

The complete circular system illustrated in Figs. 41 and 42 distinguishes itself from the one shown in Figs. 39 and 40 merely in that one of the acceleration gaps (202 of Fig. 39) is omitted in Fig. 41. The field space of the radio-frequency electric field between the two capacitor halves in the potential loop of a cavity resonator will be crossed only once per each revolution of the particles, and always in the same sense. The two guide-channels 204 and 205 of Fig. 39 have been united in the embodiment of Fig. 41 to a single guide-channel covering a complete circle, which, of necessity, must embrace the alternating magnetic flux inducing the high-frequency electric field in a toroidal space 212. In order to maximize the acceleration of particles inside a complete circular system, the mean value of the time period between two consecutive accelerations of electrically charged particles must be roughly equal to a multiple of the period, more particularly about equal to the period of the electromagnetic oscillations of the cavity resonator. Whatever else has been set forth in reference to the complete circular systems of Figs. 39 and 40 applies with equal strength also to the complete circular system of Figs. 41 and 42.

*Accelerator for particles near light velocity*

The complete circular systems illustrated in Figs. 39 to 42 can be assembled as they are or combined with single guide-channels to form complete accelerators. Basically practical embodiments shall be now discussed in connection with exemplified forms of constructions of particle accelerators, more particularly accelerators for particles close to the velocity of light. The length of the particle orbit between two consecutive accelerations will be an odd or an even multiple of the half-wave-length of the electromagnetic oscillations of the cavity resonator, according to whether accelerators comprising two acceleration sections or merely one for each revolution of the electrically charged particles in the neighborhood of light velocity are referred to.

Figs. 45 and 46 show an accelerator adapted to electrons comprising the toroidal space 212 for the radio-frequency magnetic flux and the two capacitor halves 213, 213' in the potential antinode of the cavity resonator. The plan view of said two halves of the capacitor resembles a flatiron. The electron source may be of any suitable design such as has been described in detail in connection with Fig. 16 or an electron gun of a Braun cathode-ray tube. Adjoining the electron source or emitter are single guide-channels 215 extended through semi-circles, and resembling a coil winding similar to a helix. The channels terminate at the beam exit 216. The guide-channels in Figs. 45 and 46 and subsequent similar figures are surrounded by suitable magnet systems as are shown in Figs. 34 to 36a. The lengths of the guide-channels are uniformly enlarged from the source 214, and they soon attain the constant value required for sufficiently close proximation to the velocity of light, that is, a value more particularly equal to half-wave length of the electro-magnetic oscillations of the cavity resonator. Because of the relativistic mass increment of electrons associated with each acceleration, the magnetic induction along the particle path from one guide-channel to the next must increase. Hence, the induction is the highest in the last guide-channel. Contrary to a cyclotron, in such a multiple accelerator for particles near light speed, the product of wave length and magnetic induction is no longer constant (Larmor principle), but grows with the energy of the particles. The wave-length of a multiple accelerator for particles near light speed, due to an upper limit imposed upon maximum magnetic induction, must be chosen above a minimum limit, and this limit will be the higher, the higher is the final energy of the particles.

The apparatus can be sealed as it is operated with electrons so that a pump is not required.

For accelerators for extremely high velocities, say, a hundred or several hundred million volts, a correspondingly great number of single guide-channels will be required. In such case, the construction can be made substantially cheaper and simpler when a plurality of consecutive helical threads of the coil of single guide-channels are united to a complete circular system of the kind shown in Figs. 39 and 40. This results, for instance, in a construction of a type, as shown in Figs. 47 and 48. In this embodiment, complete circular systems 217 and pairs of single guide-channels resembling a single helical line alternate with one another. For optimal focusing, these complete circular systems work preferably with magnetic induction diminishing with increasing radius. The orbit of the particles appears as a plane curve resembling a spiral. The revolutions thereof are initially, substantially smaller than the wave-length; but they increase uniformly and become, towards the end of the curve, appreciably larger than the wave-length. Taking the average of all revolutions in a complete circular system, they agree closely to the wave-length. As can be seen from Figs. 47 and 48, a pair of single guide-channels leads the particles from the outer circumference of a complete circular system 217 to the inner circumference of the next following complete system. The time of this particle travel must be closely equal to the period of the electromagnetic oscillations; in other words, the length of a pair of single guide-channels forming one thread must be approximately equal to the wave-length of the electromagnetic oscillations.

It will be understood that in Figs. 45, 46, 47 and 48 the duration of a complete revolution may be equal to an odd multiple of the half period rather than to one period. What has been stated before on the subject will not be altered as a result. The duration or time of a complete revolution may be chosen conveniently equal to from three to five times the half period in order to reduce the dimensions of the cavity resonator, provided that the incidental rise in joulean effect will still be admissible.

Figs. 49 and 50 illustrate an accelerator for particles near light speed and having only one acceleration section per revolution. As in the accelerator shown in Figs. 45 and 46, single guide-channels 215 adjoin each other similar to the threads of a helix and constitute a coil winding. The length of a complete revolution of this coil winding, as the speed of light is approached, becomes nearly equal to the wave-length of the electromagnetic oscillations of the cavity resonator. The acceleration gaps in which the curve resembling a helical line transverses the cavity resonator, lie along a straight line. As a result, the two halves 213, 213' of the capacitor in the potential antinode of the cavity resonator form oblong rectangles which are surrounded by the toroidal space transversed by the radio-frequency magnetic flux. An electron source 214' is shown only diagrammatically. Any suitable source may be employed, preferably a source as has been shown in detail in Fig. 16 and explained in connection therewith. The cavity resonator is sealed so that a pump is not required. Because of relativistic increase of mass, the magnetic induction increases from one guide-channel to the next in the accelerator shown in Figs. 49 and 50. Of course, it would be feasible to design the various revolutions between two consecutive accelerations in the form of real helical threads. A simpler way would be to form a single thread by connecting in series, two single guide-channels extended through a semi-circle and located in different planes. As will be seen, the spatial orbit in this form of construction is composed of two non-coplanar plane curves.

Figs. 51 and 52 show the magnet systems of which there is a total number of seven, for the guide-channels 215. There is provided a common magnetic core 225. Each of the guide-channels is encompassed by a coil 226 to 232 respectively. The seven coils are connected in series through a variable resistor to a battery in the same manner as has been shown in Fig. 36a for the coils of the magnet system of the apparatus according to Figs. 34–36.

Since guide-channels 215 of Figs. 51 and 52 have practically all the same diameter, and are placed parallel to one another, the cores of magnet systems of sequential guide-channels can be united with one another. The magnetic core then constitutes a body of revolution with a cross section as shown shaded in Fig. 51. To be sure, this statement is not quite correct as grooves 234 are provided in the body of revolution to accommodate the guide-channels. These grooves represent spatial curves, either in the form of helical lines or of two semi-circles displaced in plane. The flanges 233 between the slots serves as pole faces for the two adjacent guide-channels. Hence, these flanges do not have to carry the full magnetic flux which transverses a groove including a guide-channel, but merely the difference between the magnetic fluxes in two adjacent slots. Hence, the flanges 233 could not be made correspondingly thinner, a circumstance which appreciably reduces the distance between adjacent guide-channels and thereby the dimensions of the assembly.

The exciting coil 226 for each groove 234 is lodged in the bottom thereof. The outer section of each coil such as a section 226' is located on the outer surface of core 225 serving as the common and joint magnetic return path. If the energy of the particles grows from one guide-channel to the next by a contsant amount, then, if all grooves be geometrically alike in design, and if the magnetic potential-drops interiorly of the core be disregarded, the ampere-turns from one groove 234 to the next must increase a certain equal amount. The thickness of the core acting as the magnetic return path increases linearly from the first to the last guide-channel in conformity with the increase of the magnetic flux.

In an accelerator for extremely high velocities, it is again advisable to combine several consecutive helical spirals of the coil winding of these single guide-channels to form a complete circular system as in Figs. 39 and 40. The result is an embodiment as shown in Figs. 53 and 54 which follows from Figs. 49 and 50 in the same manner as the construction Figs. 47 and 48 is derived from Figs. 45 and 46. In Figs. 53 and 54, pairs of consecutive complete circular systems 217 are connected in series by a single guide-channel through a spatial curve, more particularly by two non-coplanar single guide-channels 218 covering semi-circles. In other words, in Figs. 53 and 54 complete circular systems 217 and single guide-channels 218 resembling a single thread alternate with one another.

The simplification of the magnet systems illustrated in connection with Figs. 49 and 50 and Figs. 51 and 52 could also be used to advantage in combination with modified embodiments shown in Figs. 45 to 48 and 53, 54.

Figs. 55, 56, and 57, 58 show further exemplified embodiments of multiple accelerators which are closely related to the embodiments of Figs. 49, 50 and 51, 52. The two capacitor halves 213, 213' in the potential loop of the cavity resonator form oblong rectangles in Figs. 49, 50, and 53, 54, while in Figs. 55, 56, and 57, 58, these oblong rectangles are bent into annular surfaces 213''. This again results in an arrangement which is symmetric in reference to the acceleration sections. Acting over each of the latter is exactly the same R.-F. Potential for reasons of symmetry. The guide-channels 215 of Figs. 55 and 56 in this arrangement form a coil winding resembling a helix upon the surface of a tore. The same applies to the arrangement Figs. 57 and 58 in which complete circular systems 217 alternate with single guide-channels 218.

The source of electrons 214' in Figs. 55 and 57 is indicated by a circle.

The accelerators shown in Figs. 59, 60, and 61, 62 are modifications of the embodiments illustrated in Figs. 53, 54 and 57, 58. In the embodiments of Figs. 59, 60 and 61, 62 complete circular systems 217 are connected in series directly rather than through the intermediary of single guide-channels. For this purpose, the orbit of the electrically charged articles at the exit end of the first complete circular system is placed in co-axial coincidence with the orbit at the entrance of the second complete circular system. It will be evident that this will be possible only when the two complete circular systems are in different planes.

Figs. 59, 60, and 61, 62 show the simplest arrangements for the two cases, where the two halves of the capacitor 213, 213' in the potential antinode of the cavity resonator are elongated rectangles as in Figs. 53, 54, or circular surfaces 213" as in Figs. 57 and 58.

In the embodiment of Figs. 59, 60, the cross-sections of the complete circular systems form a zig-zag arrangement, and in Figs. 61, 62 a polygon section.

Fig. 62 is not a planar section, but, for simplicity of illustration, as can be seen from Fig. 61, composed of two planar and a semi-circular portion. Also for the sake of simpleness, only two of the complete circular systems 217 are shown.

In accelerators according to Figs. 49 to 62 the duration of a complete revolution could correspond to a multiple of a period rather than to one single period. What has been stated in references to Figs. 49-62 is not altered thereby. The time of a complete revolution may be made equal to two or three times the period, in order that the dimensions of the cavity resonator may be reduced, provided that the incidentally caused rise of joulean heat losses is admissible.

In accelerators designed for particles near light speed, it is advantageous to use electron sources controlled by impulses to avoid harmful stray radiations. The control is attained by means of the oscillations of the cavity resonator as described in connection with multiple accelerators for heavy particles. The particle impulses furnished by the electron source should preferably follow directly the optimal particle.

Due to the small reduction of the intensity of the magnet fields in all the guide-channels, the optimal particle, as hitherto considered, falls out of step and a particle adjacent to the optimal particle will now travel in synchronism with the accelerating radio-frequency potential. Such manner of operation which is applicable to the previously described embodiments of accelerators with a great number of guide-channels, has certain advantages, because it causes an increase of the phase stability of particles adjacent to the synchronous particle.

Accelerators for particles near light speed as disclosed herein, have in comparison with a betatron also known as induction accelerator or rheotron the following advantages:

1. Appreciable saving of material, especially magnetic material.
2. Easily accessible electron source.
3. Straight exit of beam without deflecting field.
4. Far better focusing, especially at the beginning of the path.
5. Higher load-carrying capacity.
6. No high magnetic forces.
7. No limitation of the final energy of electrons of $10^3$ m. e. v. and over by radiation of electrons traveling in orbits. This is due to the fact that the increment in energy for each revolution of the electrons is very high in comparison with the energy loss per revolution caused by radiation. In the case of a betatron, this is no longer true in the presence of energies of around 100 m. e. v. and over.
8. No medium-frequency devices and no compensating battery for the supply of reactive power.

While the invention has been described in detail with respect to certain preferred examples and embodiments it will be understood by those skilled in the art after understanding the invention that various changes and modifications may be made without departing from the spirit and scope of the invention, and it is intended therefore, in the appended claims, to cover all such changes and modifications.

What is claimed as new and desired to be secured by Letters Patent is:

1. A spiral accelerator for electrically charged particles comprising a cavity resonator including a vacuum vessel, a source of high frequency coupled with the resonator in the zone of a current antinode for generating in the resonator electromagnetic oscillations with approximately the natural frequency of the resonator and for energizing an electrical field of high frequency and high potential amplitude in the zone of a potential antinode of the resonator, a source for generating electrically charged particles connected with the resonator for directing a current of particles into the vacuum vessel, a plurality of guide channels for guiding particles through a definite orbit from said source of particle to a target, said guide channels being disposed outside the vacuum vessel in communication with the vacuum, the zone of the vacuum vessel in which said electrical field of high potential is generated forming gaps in the guide channels which gaps during operation are successively traversed by particles traveling through the guide channels from the particle source to the target, thereby causing the particles to traverse the resonator several times in the zone of a potential antinode, and electromagnetic means encompassing each of said guide channels for producing individual magnetic fields spacially inhomogeneous in direction and strength and invariable as to each moment of time, each of said fields traversing the respective guide channel for guiding and focusing particles traveling through said channel.

2. A spiral accelerator as defined in claim 1, wherein said source of high frequency comprises a transmitting tube magnetically and inductively coupled with and extending into the vacuum vessel in the zone of a current antinode.

3. A spiral accelerator as defined in claim 1, wherein said source of electrically charged particles is disposed in direct communication with the vacuum in the vacuum vessel.

4. A spiral accelerator as defined in claim 1, wherein electromagnetic means encompassing guide channels positioned more remotely from the source of particles have magnetic properties capable of producing stronger magnetic fields than the electromagnetic means guide channels closer to the said source.

5. A spiral accelerator for electrically charged particles comprising a cavity resonator including a vacuum vessel, a source of high frequency coupled with the resonator in the zone of a current antinode for generating in the resonator electromagnetic oscillations with approximately the natural frequency of the resonator and for energizing an electrical field of high frequency and high potential amplitude in the zone of a potential antinode of the resonator, a source for generating electrically charged particles connected with the resonator for directing a current of particles into the vacuum vessel, a plurality of guide tubes for guiding particles through a definite orbit from said source of particles to a target, said guide tubes being disposed outside the vacuum vessel in communication with the vacuum, the zone of the vacuum vessel in which said electrical field of high potential is generated forming gaps in the guide tubes which gaps during operation are successively traversed by particles traveling through the guide tubes from the particle source to the target, thereby causing the particles to traverse the resonator several times in the zone of a potential antinode, and a plurality of electromagnetic means, each of said electromagnetic means encompassing a respective guide tube substantially along the entire length thereof, each guide tube being disposed between the two poles of the respective electromagnetic means for producing individual magnetic fields spacially inhomogeneous in direction and strength and invariable as to each moment of time, each of said fields traversing the respective guide tube for guiding and focusing particles traveling through said tubes.

6. A spiral accelerator for electrically charged particles comprising a cavity resonator including a vacuum vessel, a source of high frequency coupled with the resonator in the zone of a current antinode for generating in the resonator electromagnetic oscillations with approximately the natural frequency of the resonator and for energizing an electrical field of high frequency and high potential amplitude in the zone of a potential antinode of the resonator, a source for generating electrically charged particles connected with the resonator for directing a current of particles into the vacuum vessel, a plurality of guide tubes disposed outside the vacuum vessel and communicating at both ends with the vacuum vessel adjacent to a zone of the vessel in which said electrical field of high potential is generated so as to form a series of gaps connecting said tubes in succession which gaps during operation are successively traversed by particles traveling through said guide tubes from the particle source to the target, thereby causing the particles to traverse the resonator several times in the zone of a potential antinode, and a plurality of electromagnetic means, each of said electromagnetic means encompassing a respective guide tube substantially along the entire length thereof, each guide tube being disposed between the two poles of the respective electromagnetic means for producing individual magnetic fields spacially inhomogeneous in direction and strength and invariable as to each moment of time, each of said fields traversing the respective guide tube for guiding and focusing particles traveling through said tubes.

7. A spiral accelerator as defined in claim 1, wherein said cavity resonator includes two annular electrodes constituting a capacitor disposed within the vacuum vessel, the faces of said electrodes being positioned substantially parallel to each other.

8. A spiral accelerator for electrically charged heavy particles as (protons and deuterons) comprising a cavity resonator including a vacuum vessel having a shape substantially symmetrically to an axis of rotation and two annular electrodes having faces parallel to each other, a source of high frequency coupled with the resonator in the zone of a current antinode for generating in the resonator electromagnetic oscillations with approximately the natural frequency of the resonator and for energizing an electrical field of high frequency and high potential in a zone of a potential antinode between said two electrodes of the resonator, a source for generating electrically charged heavy particles connected with the resonator so as to direct a current of particles into the vacuum vessel, a plurality of guide channels for guiding particles through a definite orbit from said source of particles to a target, said guide channels being disposed outside the vacuum vessel and communicating with the vacuum vessel at said zone of a potential antinode between the two electrodes, said latter zone forming a series of gaps in the guide channels disposed on a circle substantially symmetrically to said axis of rotation, said gaps during operation being successively traversed by particles traveling through the guide channels from the particle source to the target, thereby causing the particles to traverse the cavity resonator several times in the zone of a potential antinode, and electromagnetic means encompassing each of said guide channels and producing individual magnetic fields spacially inhomogeneous in direction and strength and invariable as to each moment of time, each of said fields traversing the guide channels for guiding and focusing particles traveling through said channels.

9. A spiral accelerator as defined in claim 8, wherein said guide channels comprise substantially semi-circular tubes positioned in planes substantially parallel to said axis of rotation.

10. A spiral accelerator as defined in claim 9, wherein guide channels at greater distance from said source of particles have a greater length than the guide channels closer to the said source.

11. A spiral accelerator for electrically charged light particles as electrons comprising a cavity resonator including a vacuum vessel and two electrodes having faces parallel to each other, a source of high frequency coupled with the resonator in the zone of a current antinode for generating in the resonator electromagnetic oscillations with approximately the natural frequency of the resonator and for energizing an electrical field of high frequency and high potential amplitude in a zone of a potential antinode between said two electrodes of the resonator, a source for generating electrically charged light particles connected with the resonator for directing a current of particles into the vacuum vessel, a plurality of guide channels for guiding particles through a definite orbit from said source of particles to a target, said guide channels being disposed outside the vacuum vessel in communication with the vacuum, the zone of the vacuum vessel between said two electrodes in which zone said electrical field of high potential is generated forming gaps in the guide channels positioned substantially on a straight line, said gaps during operation being successively traversed by particles traveling through the guide channels from the particle source to the target thereby causing the particles to traverse the resonator several times in the zone of a potential antinode, and electromagnetic means encompassing each of said guide channels and producing individual magnetic fields spacially inhomogeneous in direction and strength and invariable as to each moment of time, each of said fields traversing the guide channels for guiding and focusing particles guiding and traveling through said channels.

12. A spiral accelerator as defined in claim 11, wherein said guide channels comprise substantially circular tubes including said gaps, and wherein said guide channels are positioned in planes substantially perpendicularly to said straight line on which the gaps are disposed.

13. A spiral accelerator as defined in claim 11, wherein the length of the guide channels is approximately equal to the wave length of the electromagnetic oscillations in the cavity resonator.

WALTER DÄLLENBACH.

(References on following page)

REFERENCES CITED

The following references are of record in the file of this patent:

UNITED STATES PATENTS

| Number | Name | Date |
|---|---|---|
| 1,948,384 | Lawrence | Feb. 20, 1934 |
| 2,113,671 | Zottu et al. | Apr. 12, 1938 |
| 2,229,572 | Jonas | Jan. 21, 1941 |
| 2,251,569 | Hansen | Aug. 5, 1941 |
| 2,275,480 | Varian | Mar. 10, 1942 |
| 2,331,788 | Baldwin | Oct. 12, 1943 |
| 2,335,014 | Kerst | Nov. 23, 1943 |
| 2,342,789 | Cassen | Feb. 29, 1944 |
| 2,438,954 | Townes | Apr. 6, 1948 |
| 2,457,495 | Rochester | Dec. 28, 1948 |